US011225154B2

(12) United States Patent
Matsuo et al.

(10) Patent No.: US 11,225,154 B2
(45) Date of Patent: Jan. 18, 2022

(54) METHOD FOR CONTROLLING POWER TRANSMITTING DEVICE IN WIRELESS POWER TRANSMISSION SYSTEM AND POWER TRANSMITTING DEVICE

(71) Applicant: Panasonic Intellectual Property Management Co., Ltd., Osaka (JP)

(72) Inventors: Hiroyuki Matsuo, Osaka (JP); Tetsuro Sawai, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/151,855

(22) Filed: Jan. 19, 2021

(65) Prior Publication Data

US 2021/0162876 A1 Jun. 3, 2021

Related U.S. Application Data

(63) Continuation of application No. 16/516,227, filed on Jul. 18, 2019, now Pat. No. 10,926,651, which is a
(Continued)

(30) Foreign Application Priority Data

Feb. 9, 2017 (JP) .............................. JP2017-022262
Nov. 21, 2017 (JP) .............................. JP2017-223726

(51) Int. Cl.
*H02J 50/90* (2016.01)
*B60L 53/124* (2019.01)
(Continued)

(52) U.S. Cl.
CPC ............. *B60L 53/124* (2019.02); *B60L 53/35* (2019.02); *H01F 27/02* (2013.01); *H01F 38/14* (2013.01);
(Continued)

(58) Field of Classification Search
CPC ........ B60L 53/124; B60L 53/35; B60L 50/53; B60L 5/005; H02J 50/90; H02J 50/12;
(Continued)

(56) References Cited

U.S. PATENT DOCUMENTS 10,454,310 B2 * 10/2019 Fujiwara ............... B60L 53/126
2013/0175987 A1 7/2013 Amma et al.
(Continued)

FOREIGN PATENT DOCUMENTS

JP 2010-226946 10/2010
JP 2012-085472 4/2012
(Continued)

OTHER PUBLICATIONS

International Search Report of PCT application No. PCT/JP2017/046903 dated Mar. 13, 2018.
(Continued)

*Primary Examiner* — Daniel Cavallari
(74) *Attorney, Agent, or Firm* — Renner, Otto, Boisselle & Sklar, LLP

(57) ABSTRACT

A device includes a power transmitting coil that outputs power to a power receiving coil included in a mobile object, a case that includes the power transmitting coil inside thereof, a mobile member arranged on the case at a position overlapping the power transmitting coil, and a circuit that controls the power transmitting coil and the mobile member. The circuit starts to perform an operation to move the mobile member from a position overlapping the power transmitting coil to a position not overlapping the power transmitting coil before the power transmitting coil and the power receiving coil are aligned with each other, and causes the power transmitting coil to output the power to the power receiving coil.

16 Claims, 31 Drawing Sheets

Related U.S. Application Data continuation of application No. PCT/JP2017/046903, filed on Dec. 27, 2017.

(51) Int. Cl.
| | | |
|---|---|---|
| *H02J 50/12* | (2016.01) | |
| *H02J 50/60* | (2016.01) | |
| *B60L 53/35* | (2019.01) | |
| *H01F 27/02* | (2006.01) | |
| *H01F 38/14* | (2006.01) | |

(52) U.S. Cl.
CPC .............. *H02J 50/12* (2016.02); *H02J 50/60* (2016.02); *H02J 50/90* (2016.02)

(58) Field of Classification Search
CPC .......... H02J 50/60; H02J 50/005; H02J 50/10; H01F 27/02; H01F 38/14; Y02T 90/12; Y02T 10/7072; Y02T 90/14; Y02T 10/70
See application file for complete search history.

(56) References Cited

U.S. PATENT DOCUMENTS

| | | |
|---|---|---|
| 2014/0239735 A1 | 8/2014 | Abe et al. |
| 2015/0123609 A1 | 5/2015 | Niizuma |
| 2017/0043672 A1 | 2/2017 | Araki et al. |
| 2019/0337404 A1 | 11/2019 | Matsuo et al. |

FOREIGN PATENT DOCUMENTS

| | | | |
|---|---|---|---|
| JP | 2012-147634 | 8/2012 | |
| JP | 2013-059239 | 3/2013 | |
| JP | 2013-115915 | 6/2013 | |
| JP | 2014-023296 | 2/2014 | |
| JP | 2014-039403 | 2/2014 | |
| JP | 2015-006056 | 1/2015 | |
| JP | 2015-008546 | 1/2015 | |
| JP | 2015-100162 | 5/2015 | |
| JP | 2015-220934 | 12/2015 | |
| JP | 2016-037733 | 3/2016 | |
| JP | 2016-059139 | 4/2016 | |
| JP | 2016-059236 | 4/2016 | |
| JP | 2018-130008 A | 8/2018 | |
| WO | 2014200024 A1 | 12/2014 | |
| WO | WO-2014200024 A1 * | 12/2014 | .............. H02J 7/025 |

OTHER PUBLICATIONS

Allowed claims from Parent U.S. Appl. No. 16/516,227, filed Jul. 18, 2019.

* cited by examiner

FIG. 14A
| METAL FOREIGN OBJECT DETECTION MEANS | METAL FOREIGN OBJECT | METHOD FOR SUPPLYING POWER |
|---|---|---|
| NO | NO | MOVE MOBILE MEMBER TO POSITION NOT OVERLAPPING POWER TRANSMITTING COIL AND SUPPLY POWER |
| | YES | |
| YES | NO | SUPPLY POWER WITHOUT MOVING MOBILE MEMBER |
| | YES | MOVE MOBILE MEMBER TO POSITION NOT OVERLAPPING POWER TRANSMITTING COIL AND SUPPLY POWER |
FIG. 14B
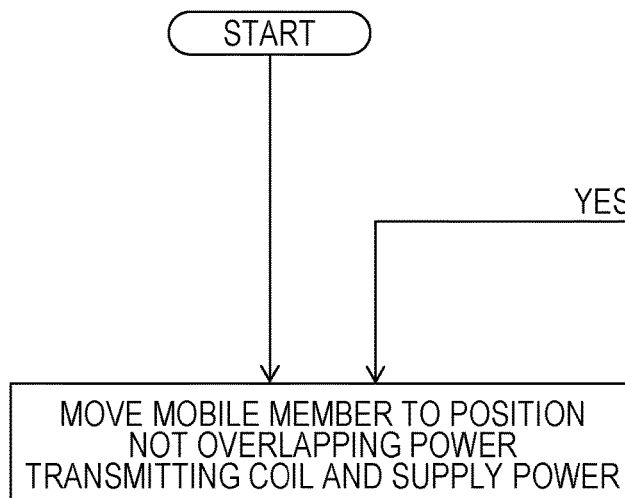
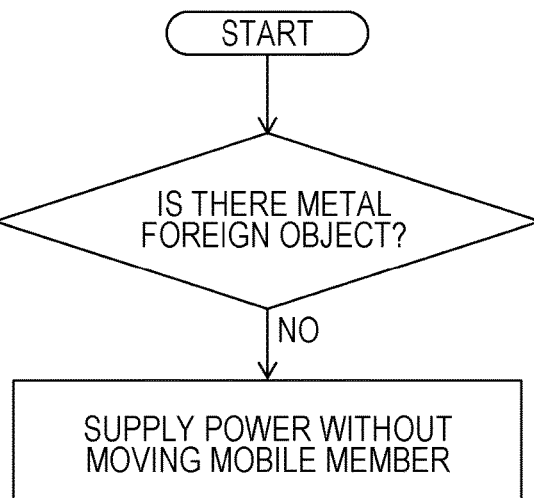

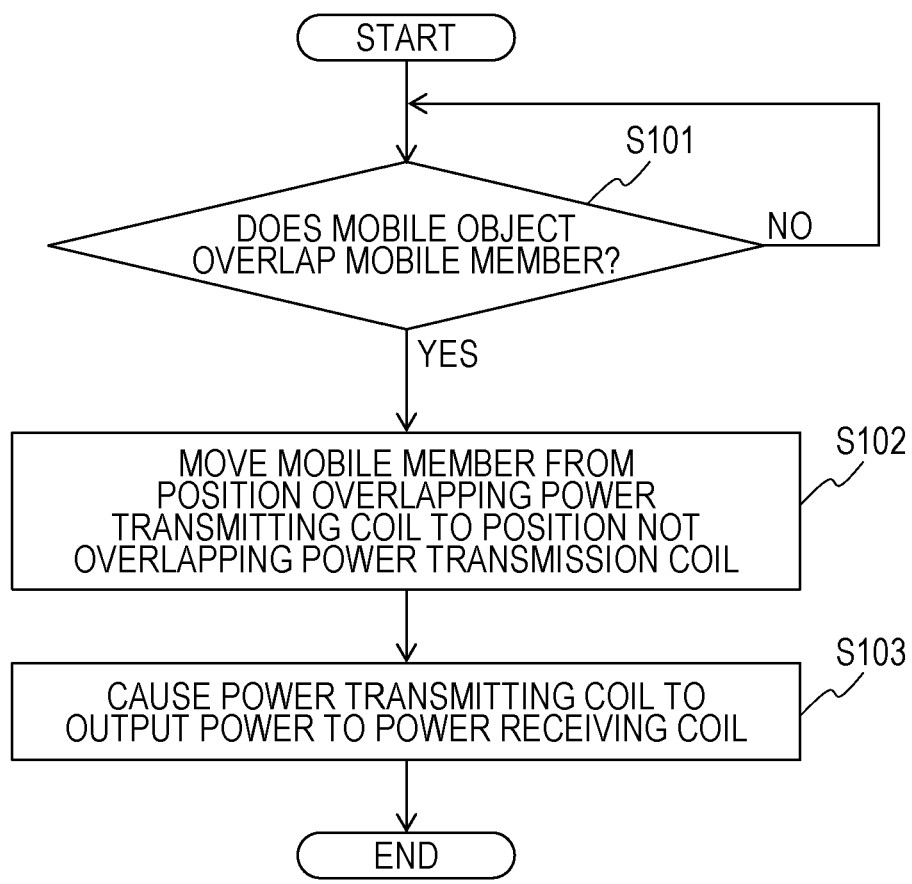

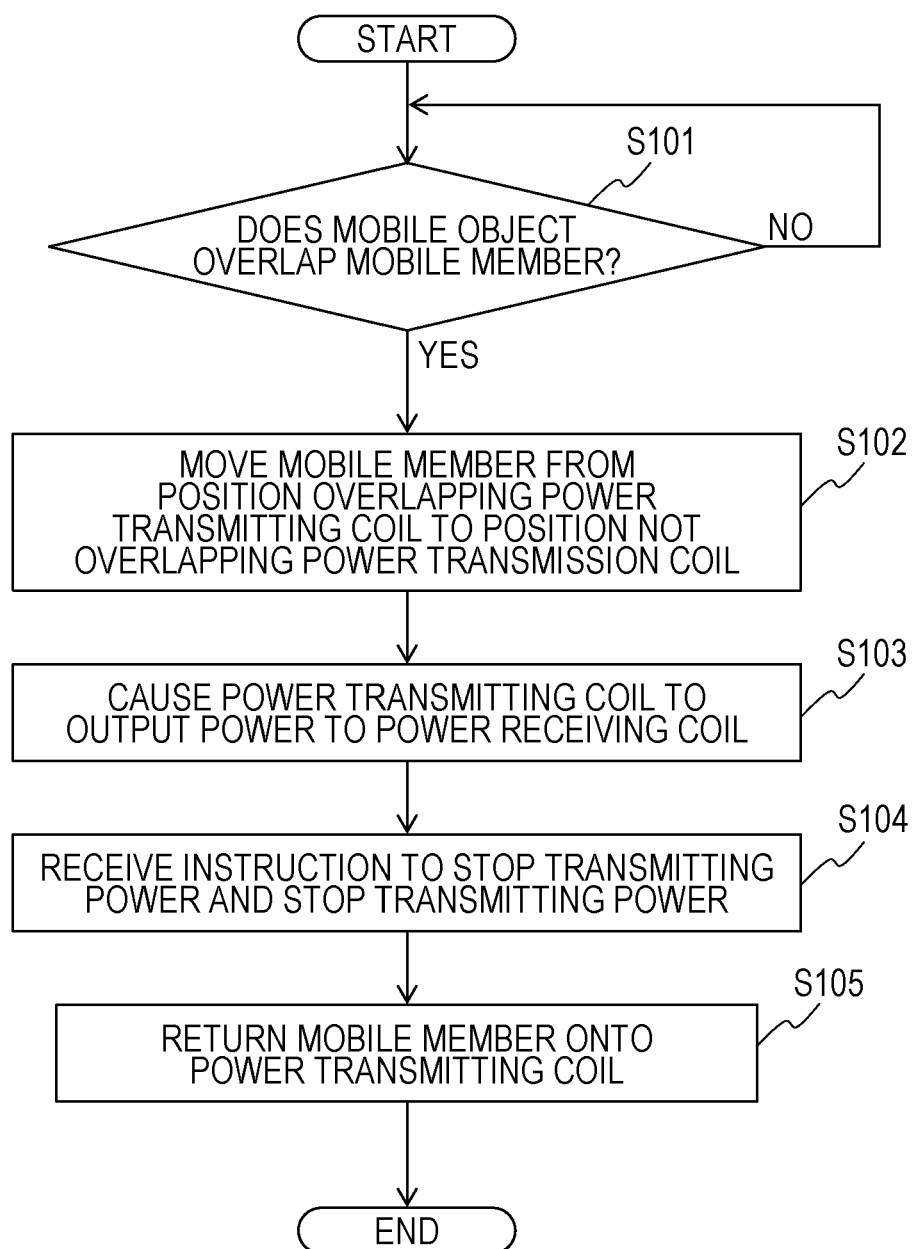

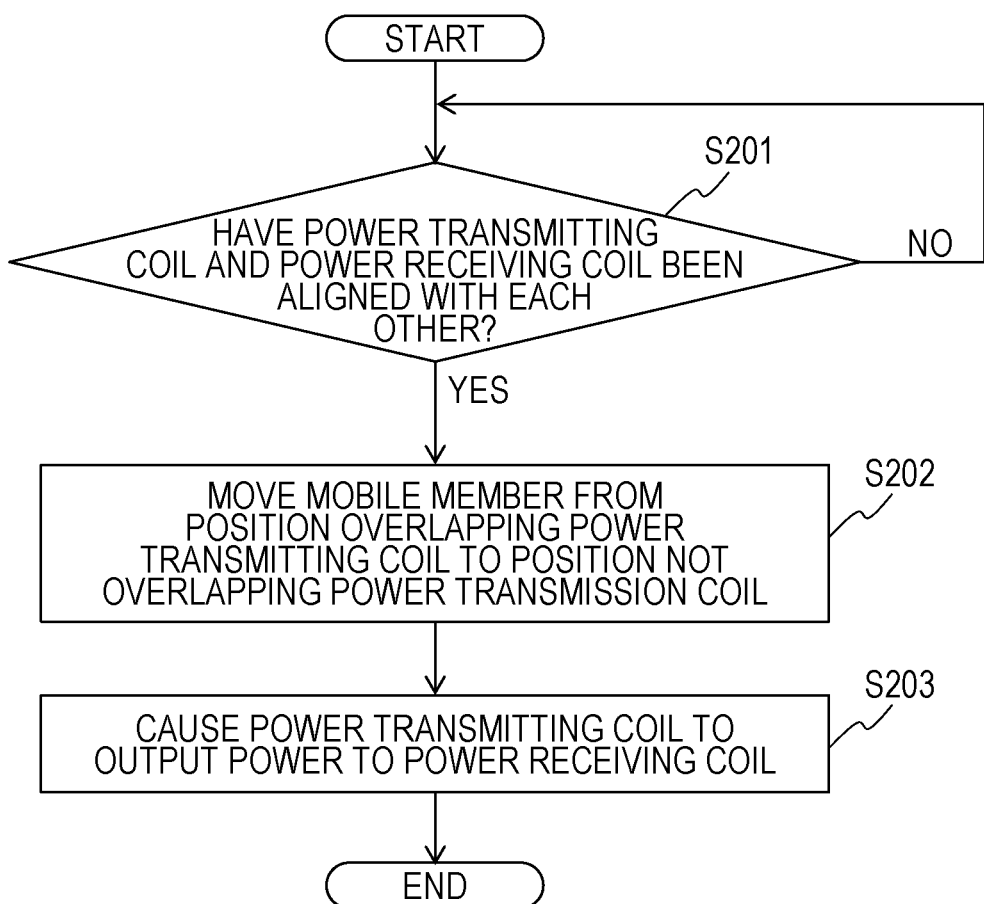

METHOD FOR CONTROLLING POWER TRANSMITTING DEVICE IN WIRELESS POWER TRANSMISSION SYSTEM AND POWER TRANSMITTING DEVICE

This application is a continuation under 35 USC § 120 of U.S. application Ser. No. 16/516,227, filed Jul. 18, 2019, which is a continuation of International Application No. PCT/JP2017/046903, filed Dec. 27, 2017, the entire disclosures of which are incorporated herein by reference.

BACKGROUND

1. Technical Field

The present disclosure relates to a method for controlling a power transmitting device in a wireless power transmission system and the power transmitting device.

2. Description of the Related Art

A wireless power transmission system used for mobile objects such as vehicles electromagnetically couples a power transmitting coil included in a power transmitting device and a power receiving coil included in a power receiving device with each other and transmits power from the power transmitting coil to the power receiving coil.

SUMMARY

If there is a metal foreign object such as an empty can or a coin between a power transmitting coil and a power receiving coil, the surface temperature of the metal foreign object might increase due to a magnetic field caused by the power transmitting coil during transmission of power, which can cause a safety concern.

One non-limiting and exemplary embodiment improves safety at a time when a metal foreign object has entered an area on a power transmitting coil.

In one general aspect, the techniques disclosed herein feature a method including starting to move a mobile member from a position overlapping a power transmitting coil to a position not overlapping the power transmitting coil before the power transmitting coil and a power receiving coil are aligned with each other, the power receiving coil being included in a mobile object, and causing the power transmitting coil to output the power to the power receiving coil. The techniques further include providing a device including a power transmitting coil that outputs power to a power receiving coil included in a mobile object, a case that includes the power transmitting coil inside thereof, a mobile member arranged on the case at a position overlapping the power transmitting coil, and a circuit that controls the power transmitting coil and the mobile member. The circuit starts to perform an operation to move the mobile member from a position overlapping the power transmitting coil to a position not overlapping the power transmitting coil before the power transmitting coil and the power receiving coil are aligned with each other, and causes the power transmitting coil to output the power to the power receiving coil.

According to the aspect of the present disclosure, a metal foreign object that has come to a position overlapping a power transmitting coil is not removed but moved. As a result, the surface temperature of the metal foreign object does not increase, and the safety of a wireless power transmission system improves.

It should be noted that the above general or specific aspect may be implemented as a device, a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 14A is a table indicating that a power supply method differs depending on whether there is means for detecting a metal foreign object held on a surface of the mobile member;

FIG. 14B is a flowchart illustrating an outline of the operation of the power transmission control circuit;

FIG. 15A is a flowchart illustrating a basic flow of an operation performed by the power transmission control circuit;

FIG. 15B is a flowchart illustrating an operation obtained by adding steps S104 and S105 to the operation illustrated in FIG. 15A;

FIG. 15C is a flowchart illustrating a basic flow of an operation for beginning to move the mobile member when the power transmitting coil and the power receiving coil have been aligned with each other;

DETAILED DESCRIPTION

Underlying Knowledge Forming Basis of the Present Disclosure

Underlying knowledge forming a basis of the present disclosure will be described before describing embodiments of the present disclosure.

Figure 1:
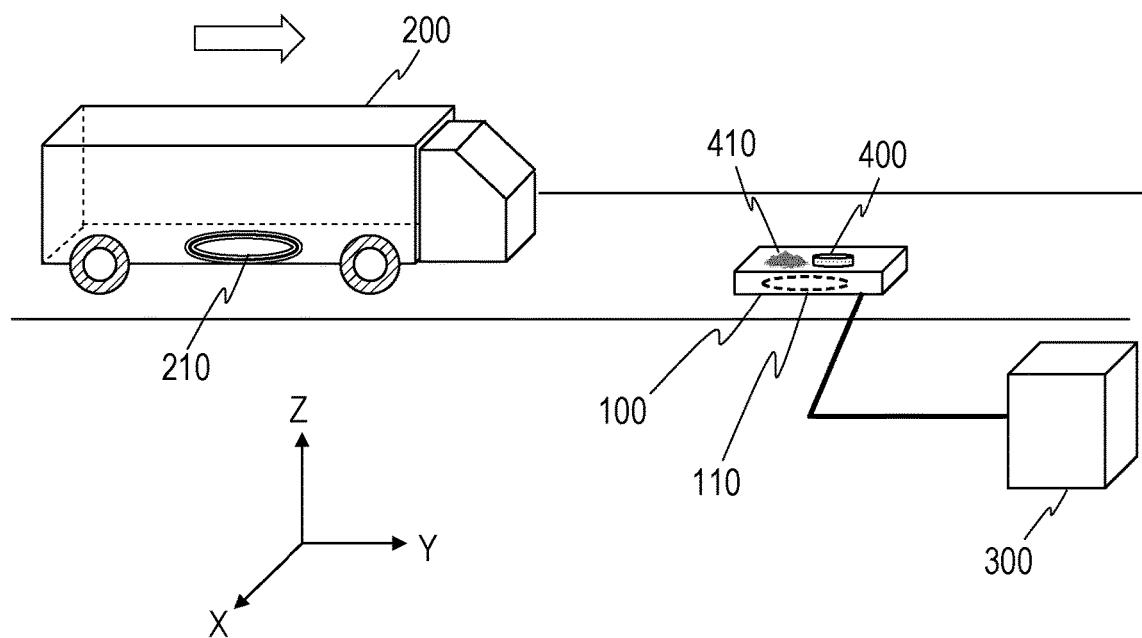
FIG. 1 is a diagram schematically illustrating an example of a wireless power transmission system that wirelessly supplies power to a mobile object.

FIG. 1 is a diagram schematically illustrating an example of a wireless power transmission system that wirelessly supplies power to a mobile object 200. In the wireless power transmission system, a power transmitting coil 110 arranged along a road surface wirelessly transmits power to a power receiving coil 210 arranged on a bottom surface of the mobile object 200. In this example, the mobile object 200 is a vehicle driven by an electric motor. The mobile object 200 can be a vehicle such as a bus, an automobile, a train, or an automated guided vehicle (AGV), but may be a mobile object other than a vehicle.

FIG. 1 illustrates XYZ coordinates indicating X, Y, and Z directions perpendicular to one another. In the following description, the XYZ coordinates illustrated in FIG. 1 will be used. The Y direction is a traveling direction of the mobile object 200, the Z direction is perpendicular to the road surface, and the X direction is perpendicular to the Y and Z directions. Directions of structures illustrated in the drawings of the present disclosure are determined in consideration of the simplicity of description, and do not limit directions used when the embodiments of the present disclosure are actually implemented. In addition, shapes and sizes of some or all of the structures illustrated in the drawings do not limit actual shapes and sizes.

The wireless power transmission system includes a power transmitting device 100 and a power receiving device. The power transmitting device 100 outputs, from the power transmitting coil 110 to the power receiving coil 210, power supplied from an external power supply 300. The power receiving device is provided for the mobile object 200. The power receiving device includes components such as a rectifier circuit and a power reception control circuit, which are not illustrated, as well as the power receiving coil 210.

In this system, if there is a metal foreign object 400 on or around the power transmitting coil 110, however, the metal foreign object 400 might be heated during transmission of power, which can cause a safety concern. Various techniques for detecting a metal foreign object at a time of transmission of power and removing the metal foreign object have been proposed.

Figure 22:
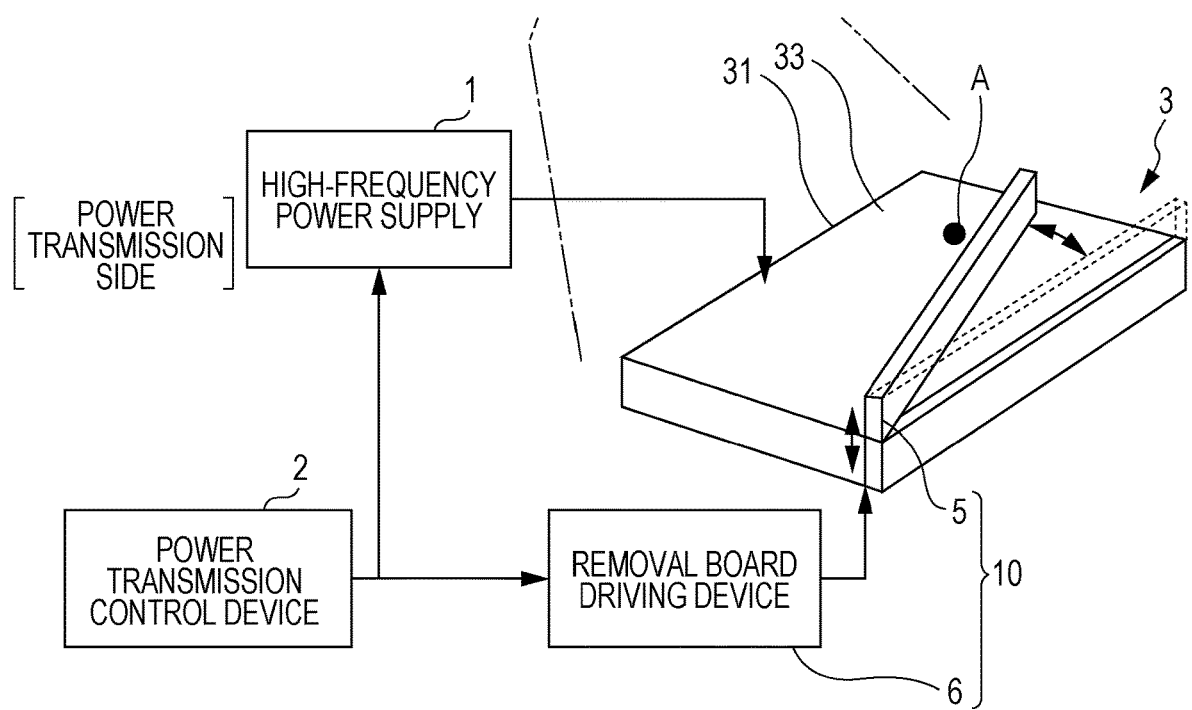
FIG. 22 is a diagram illustrating a part of FIG. 1 of Japanese Unexamined Patent Application Publication No. 2016-59236.

Japanese Unexamined Patent Application Publication No. 2016-59236, for example, discloses an apparatus that removes a metal foreign object from an upper surface of a power transmitting device using a member such as a foreign object removal board or a brash. The foreign object removal board is a member similar to a windshield wiper of an automobile. A part of FIG. 1 of this example of the related art is cited as FIG. 22 for reference.

With the method disclosed in this example of the related art, a foreign object might not be removed from an upper surface of a power transmitting device depending on a type of object. A foreign object on an upper surface of a power transmitting coil can be, for example, a metal foreign object such as a coin containing a metal such as copper, zinc, or nickel, a steel can, or an aluminum can, a non-metal foreign object such as dirt or mad, or an animal such as an insect or a cat. Some foreign objects can pass through a gap between an upper surface (i.e., a flat surface) of a power transmitting device and a foreign object removal member and remain on the upper surface of the power transmitting device. It is thus difficult to certainly remove a metal foreign object by a method for removing a metal foreign object using certain means.

The present inventors have identified the above problem and examined configurations for solving the problem. The present inventors have found that heating of a metal foreign object can be prevented not by removing the metal foreign object but by using a member (referred to as a "mobile member" herein) for holding the metal foreign object at a position overlapping a power transmitting coil and moving the metal foreign object to a position not overlapping the power transmission coil.

The present inventors have conceived the following aspects of the present disclosure on the basis of the above knowledge.

A method for controlling a power transmitting device including a power transmitting coil that outputs power to a power receiving coil, a case that includes the power transmitting coil inside thereof, and a mobile member arranged on a surface of the case at a position overlapping the power transmitting coil, the method comprising:

moving, if the mobile member holds a metal foreign object, the metal foreign object from the position overlapping the power transmitting coil to a position not overlapping the power transmitting coil by moving the mobile member from the position overlapping the power transmitting coil to a position not overlapping the power transmitting coil before the power transmitting coil begins to transmit the power to the power receiving coil;

causing the power transmitting coil to output the power to the power receiving coil; and moving, if another metal foreign object comes to the position overlapping the power transmitting coil when the mobile member is located at the position not overlapping the power transmitting coil, the other metal foreign object from the position overlapping the power transmitting coil to a position not overlapping the power transmitting coil by returning the mobile member from the position not overlapping the power transmitting coil to the position overlapping the power transmitting coil in the state where the mobile member holds the foreign matter.

In the method according to this aspect, a metal foreign object is not removed but moved from a position overlapping the power transmitting coil to a position not overlapping the power transmitting coil by the mobile member that holds metal foreign objects. As a result, the surface temperature of the metal foreign object does not increase during transmission of power, and the safety of a wireless power transmission system improves.

A "mobile object" herein is not limited to a vehicle but refers to any mobile object driven by electricity. Mobile objects include, for example, an electrically operated vehicle including an electric motor and one or more wheels. Such a vehicle can be an AGV such as a carrier robot, an electric vehicle (EV), or an electric cart. A "mobile object" herein can also be a mobile object without wheels. Such mobile objects include, for example, a biped robot, an unmanned aerial vehicle (UAV; a so-called "drone") such as a multi-copter, and a manned electric aircraft.

Figure 2:
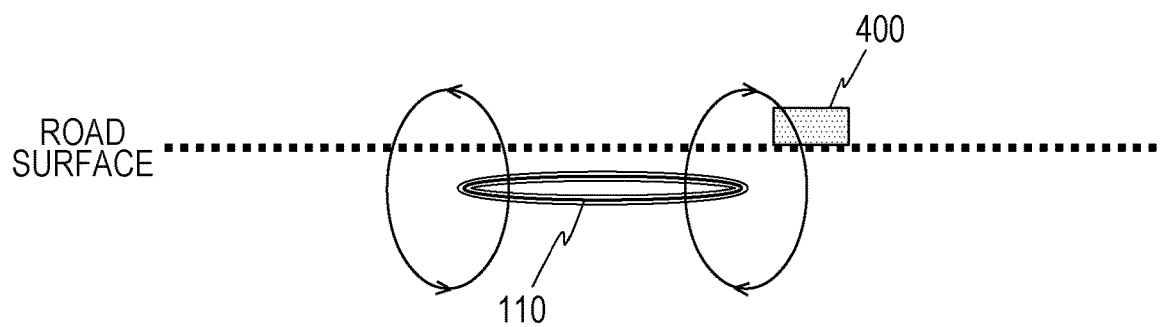
FIG. 2 is a diagram illustrating an example of a state where there is a metal foreign object at a position overlapping a power transmitting coil.

A "position overlapping the power transmitting coil" herein refers to a position at which the temperature of a metal foreign object can increase due to a magnetic field generated by the power transmitting coil. FIG. 2, for example, illustrates an example of a state where there is a metal foreign object 400 on a power transmitting coil 110. Arrows in FIG. 2 schematically indicate two lines of magnetic force. As in this example, even when the metal foreign object 400 is not located directly above the power transmitting coil 110, the surface temperature of the metal foreign object 400 can increase due to a magnetic field generated by the power transmitting coil 110. An area in which the surface temperature of the metal foreign object 400 can increase expands as output power becomes larger. Although FIG. 2 illustrates only one power transmitting coil 110, there may be a plurality of power transmitting coils 110, instead. If the power transmitting device 100 includes a plurality of power transmitting coils 110, a "position overlapping the power transmitting coils" refers to a position at which the temperature of a metal foreign object can increase due to a magnetic field generated by the power transmitting coils 110. In the following description, the metal foreign object 400 will be regarded as being located at a position overlapping the power transmitting coil 110 insofar as the surface temperature of the metal foreign object 400 increases, even if the metal foreign object 400 is not located directly above the power transmitting coil 110. Cases where the metal foreign object 400 is not located directly above the power transmitting coil 110 include, as in an example illustrated in FIG. 11B, which will be referred to later, a case where a surface of the power transmitting coil 110 is parallel to a direction of gravity. The cases also include, as in the case of a configuration illustrated in FIG. 12, which will be referred to later, a case where a direction of lines of magnetic force from the power transmitting coil 110 is changed by a magnetic body.

The mobile member being "arranged at a position overlapping the power transmitting coil" means that a part of the mobile member capable of holding a metal foreign object is arranged at the position overlapping the power transmitting coil. Not the entirety of the mobile member needs to be at the position overlapping the power transmitting coil. When at least a part of the mobile member moves from a position overlapping the power transmitting coil to a position not overlapping the power transmitting coil and a metal foreign object is held by the part, an increase in the temperature of the metal foreign object can be avoided.

First Embodiment

More specific embodiments of the present disclosure will be described hereinafter. Unnecessarily detailed description, however, might be omitted. For example, detailed description of well-known facts and redundant description of substantially the same components might be omitted in order to avoid redundancy and facilitate understanding. The present inventors provide the following description and the accompanying drawings in order for those skilled in the art to fully understand the present disclosure, not in order to limit a subject matter described in the claims. In the following description, the same or similar components are given the same reference numerals.

Basic Configuration

A wireless power transmission system according to a first embodiment basically has the same configuration as that illustrated in FIG. 1. That is, the wireless power transmission system includes the power transmitting device 100 and the power receiving device included in the mobile object 200. As illustrated in FIG. 1, the power transmitting device 100 is electrically connected to the external power supply 300 through a cable. The power transmitting device 100 includes the power transmitting coil 110 inside a case thereof. A foreign object can exist on the power transmitting coil 110 of the power transmitting device 100. A foreign object can be, for example, a metal foreign object 400 such as a coin containing a metal such as copper, zinc, or nickel, a steel can, an aluminum can or a non-metal foreign object 410 such as dirt or mad.

Figure 3:
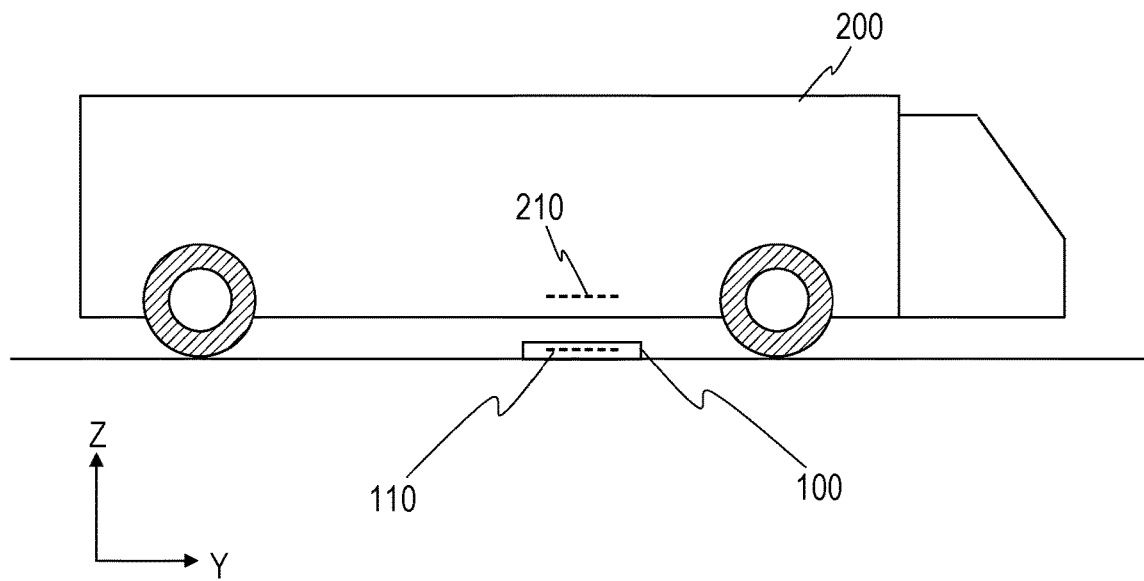
FIG. 3 is a schematic diagram illustrating a state where the power transmitting coil is transmitting power to a power receiving coil in a noncontact manner.

FIG. 3 is a schematic diagram illustrating a state where the power transmitting coil 110 and the power receiving coil 210 face each other and the power transmitting coil 110 is transmitting power to the power receiving coil 210 in a noncontact manner. As illustrated in FIG. 3, the power transmitting coil 110 is electromagnetically (or magnetically) coupled with the power receiving coil 210 and outputs power to the power receiving coil 210. The power receiving coil 210 is magnetically coupled with the power transmitting coil 110 through a magnetic field caused by the power transmitting coil 110 and receives at least part of the transmitted power (i.e., energy). The power receiving coil 210 supplies the received power to a load (a secondary battery, etc.) in the mobile object 200 through a rectifier circuit, which is not illustrated. Power is thus supplied to the mobile object 200.

Figure 4:
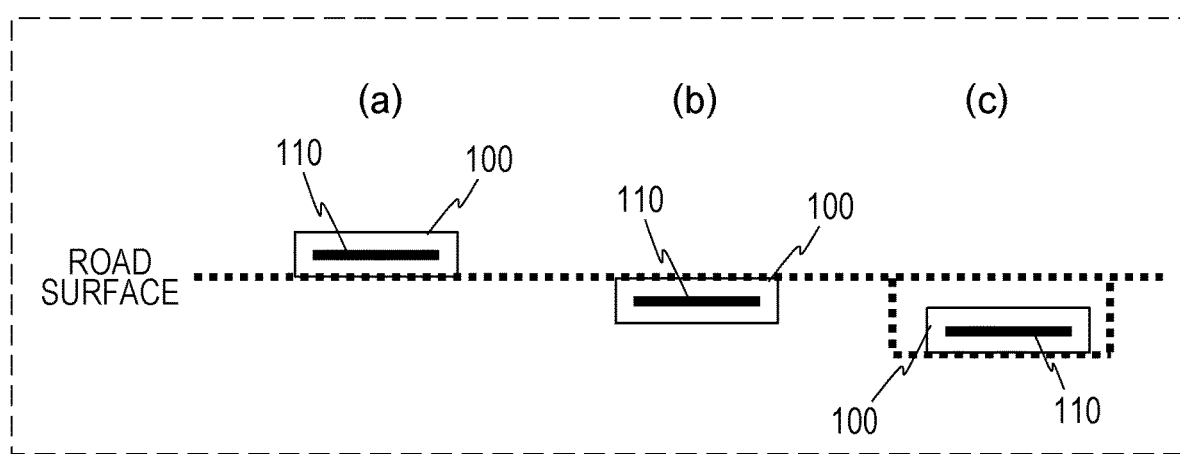
FIG. 4 is a diagram illustrating variations of arrangement of an upper surface of a power transmitting device.

The power transmitting device 100 according to the present embodiment is arranged on a road surface. A part or the entirety of the power transmitting device 100, however, may be buried in a road surface, instead. FIG. 4 is a diagram illustrating variations of arrangement of an upper surface (hereinafter also referred to simply as a "surface") of the power transmitting device 100. FIG. 4 illustrates three variations. In an example illustrated in a part (a) of FIG. 4, the surface of the power transmitting device 100 is above a road surface. In an example illustrated in a part (b) of FIG. 4, the surface of the power transmitting device 100 is substantially as high as the road surface. In an example illustrated in the part (c) of FIG. 4, the surface of the power transmitting device 100 is below the road surface. In the examples illustrated in the parts (b) and (c) of FIG. 4, a hole is cut in the road surface, and the case of the power transmitting device 100 is buried in the hole. The power transmitting device 100 may be arranged in any of these manners.

Figure 5A:
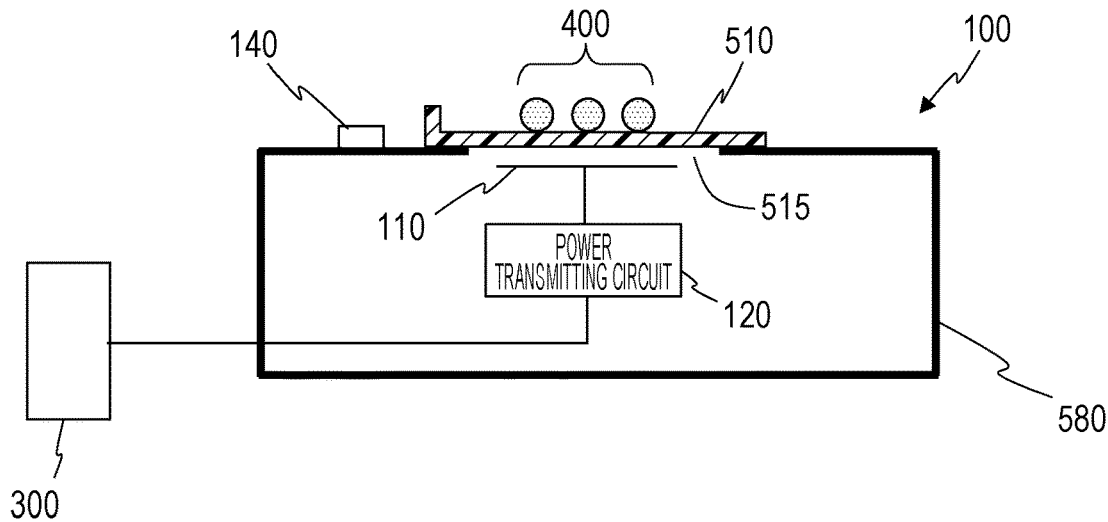
FIG. 5A is a diagram schematically illustrating a cross-section of the power transmitting device taken along a Y-Z plane.

FIG. 5A is a diagram schematically illustrating a cross-section of the power transmitting device 100 taken along a Y-Z plane. The power transmitting device 100 includes a case 580, a mobile member 510, the power transmitting coil 110, and a power transmitting circuit 120. The power transmitting circuit 120 converts power supplied from the external power supply 300 into alternating current power having a frequency and a voltage suitable for transmission of power and outputs the alternating current power. The power transmitting coil 110 is connected to the power transmitting circuit 120 and transmits the alternating current power supplied from the power transmitting circuit 120 to the power receiving coil 210. The power transmitting circuit 120 includes components that are not illustrated in FIG. 5A, such as an inverter circuit and a power transmission control circuit. The power transmission control circuit drives the inverter circuit and controls power to be transmitted and also drives an actuator, which is not illustrated in FIG. 5A, to move the mobile member 510.

Figure 5B:
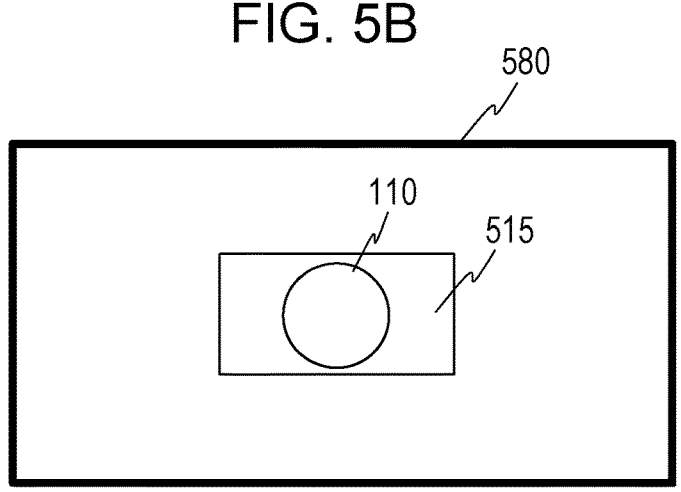
FIG. 5B is a schematic diagram illustrating a case of the power transmitting device from which a mobile member has been removed and that is viewed from a +Z direction.

The case 580 according to the present embodiment includes an opening 515 in an upper surface thereof. The case 580 stores the power transmitting circuit 120 and the power transmitting coil 110 inside thereof. FIG. 5B is a schematic diagram illustrating the case 580 of the power transmitting device 100 from which the mobile member 510 has been removed and that is viewed from above (+Z direction). In this example, the opening 515 is larger than the power transmitting coil 110 when viewed from above the case 580.

A material and/or a shape of an upper surface of the case 580 including the opening 515 can be selected or designed such that temperature around the opening 515 in the upper surface of the case 580 does not exceed a certain degree, namely, for example, 50 or 40 degrees Celsius, due to heat caused by power output from the power transmitting coil 110. The upper surface of the case 580 can be composed, for example, of a non-metal material or a non-magnetic material such as a resin.

The size of the opening 515 can be set, for example, such that the temperature around the opening 515 in the upper surface of the case 580 does not exceed the certain degree, namely, for example, 50 or 40 degrees Celsius. In this case, a material that can be heated by power output from the power transmitting coil 110, namely a material including a magnetic material, such as stainless steel, for example, may be used for the material and/or the shape of the upper surface of the case 580.

The opening 515 need not necessarily be provided. By providing the opening 515 in combination with a mechanism such as a conveyer belt, however, foreign objects can be more certainly eliminated. A foreign object that has come to a position facing the power transmitting coil 110 after the mobile member 510 has moved from the position facing the power transmitting coil 110, for example, can be removed by the conveyor belt. Details of such a configuration will be described in a second embodiment.

Figure 5C:
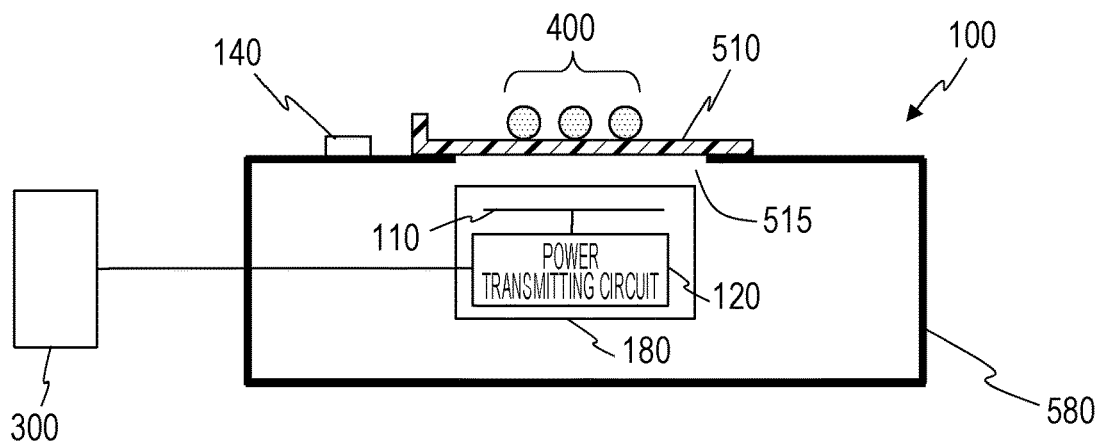
FIG. 5C is a diagram schematically illustrating another example of the configuration of the power transmitting device.

FIG. 5C is a diagram schematically illustrating another example of the configuration of the power transmitting device 100. In this example, the power transmitting device 100 includes a power transmitting circuit case 180. The power transmitting circuit case 180 stores the power transmitting circuit 120 and the power transmitting coil 110. The power transmitting circuit case 180 can protect the power transmitting coil 110 from a foreign object (a metal object or a non-metal object) entering from the opening 515. In addition, since the power transmitting coil 110 and the power transmitting circuit 120 are integrated together, the power transmitting coil 110 and the image forming apparatus communication module 130 can be easily mounted or removed during assembling or in the case of malfunction.

In addition, as described in a third embodiment, which will be described later, even if water enters the inside of the case 580 after the opening 515 is exposed, the power transmitting circuit case 180 protects the power transmitting coil 110 and the power transmitting circuit 120. It is therefore possible to avoid a fault or an abnormal operation of the power transmitting device 100 due to entry of water.

A material or a shape of the power transmitting circuit case 180 is desirably a material or a shape that is not heated by power output from the power transmitting coil 110. A non-metal material such as a resin, for example, is desirable.

The mobile member 510 is arranged on the case 580 and covers the pixels 151 in an initial state. In this state, the mobile member 510 prevents foreign objects (e.g., metal foreign objects 400) from entering the case 580 through the opening 515. The mobile member 510 has such a shape that the mobile member 510 can hold the metal foreign objects 400. The mobile member 510 according to the present embodiment has a flat bottom surface. The flat bottom surface covers the opening 515.

Figure 6:
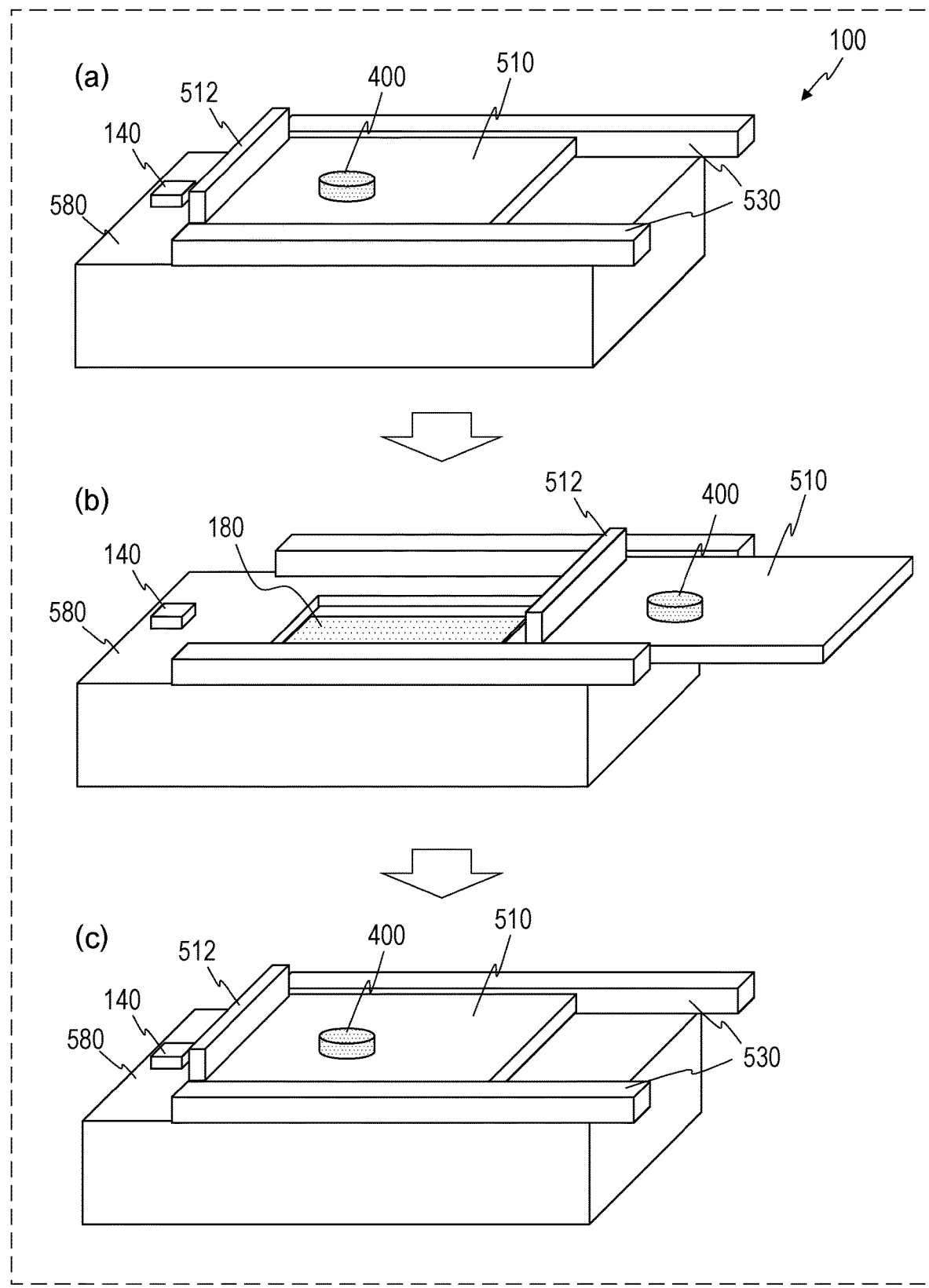
FIG. 6 is a diagram illustrating an outline of an operation according to a first embodiment.

FIG. 6 is a diagram illustrating an outline of an operation according to the present embodiment. In an example illustrated in a part (a) of FIG. 6, the power transmitting device 100 includes an actuator 530 for moving the mobile member 510. The actuator 530 can be a linear-motion mechanism including an electric motor (hereinafter also referred to simply as a "motor") and a plurality of gears (e.g., include a rack and pinion). The actuator 530 can slide the mobile member 510 along the upper surface (flat surface) of the case 580 in accordance with an instruction from the power transmission control circuit. Before transmitting power, the power transmission control circuit drives the actuator 530 to move the mobile member 510 from a position overlapping the power transmitting coil 110 to a position not overlapping the power transmitting coil 110. As a result of this operation, even if there is a metal foreign object 400 on the mobile member 510, the metal foreign object 400 is moved to the position not overlapping the power transmitting coil 110 (a part (b) of FIG. 6). By transmitting power to the power receiving coil 210 from the power transmitting coil 110 in this state, power can be safely transmitted. After the transmission of power is completed, the power transmission control circuit drives the actuator 530 to return the mobile member 510 to the position overlapping the power transmitting coil 110 (a part (c) of FIG. 6).

The mobile member 510 may begin to move at any timing before a beginning of power transmission. The mobile member 510 may begin to move, for example, when the mobile object 200 has overlapped the mobile member 510 (e.g., the mobile object 200 has covered the mobile member 510) or when the power receiving coil 210 has reached a position facing the power transmitting coil 110 (e.g., when alignment, which will be described later, has been completed). A position sensor 140 illustrated in FIG. 5A, for example, can detect whether the mobile object 200 has overlapped the mobile member 510 or whether the power receiving coil 210 has reached the position facing the power transmitting coil 110.

The position sensor 140 detects a position of the mobile object 200. The power transmission control circuit can identify a relative positional relationship (e.g., a distance) between the mobile object 200 and the power transmitting device 100 on the basis of information output from the position sensor 140.

When the mobile object 200 overlaps the mobile member 510, it is unlikely that the metal foreign object 400 comes into contact with the mobile member 510 because the mobile object 200 serves as an obstacle. It is therefore preferable for the power transmission control circuit to begin to move the mobile member 510 when it has been detected that the mobile object 200 has moved to a position overlapping the mobile member 510.

The expression "the mobile object 200 overlaps the mobile member 510" refers to a state where the mobile object 200 overlaps the mobile member 510 at least partly when viewed in a direction perpendicular to a surface (referred to as a "power transmitting coil surface" herein) of the power transmitting coil 110 from which power is output. The power transmitting coil surface corresponds to, when the power transmitting coil 110 is a planar coil, a surface formed by the winding of the power transmitting coil 110.

A material and a shape of the mobile member 510 are not particularly limited insofar as the mobile member 510 can hold the metal foreign object 400. In consideration of a possibility that the mobile member 510 might stop during movement due to a malfunction, however, it is desirable to select a material and/or a shape that is not heated by power output from the power transmitting coil 110. The material of the mobile member 510 can be a non-metal material such as a resin. When a material and/or a shape that is not heated by transmitted power has been selected, power can be safely transmitted even while the mobile member 510 is closed (i.e., while the mobile member 510 is at a position overlapping the power transmitting coil 110) if there is no metal foreign object 400. The power transmission control circuit may therefore detect presence or absence of the metal foreign object 400 with a sensor and, only when the metal foreign object 400 has been detected, move the mobile member 510.

The mobile member 510 according to the present embodiment includes a foreign object movement stopper (stopper) 512 for preventing the metal foreign object 400 from dropping down to the power transmitting coil 110 during movement. The stopper 512 is a side wall provided on an end of the mobile member 510 opposite a movement direction. As a result, even if the mobile member 510 is moved quickly, it is unlikely that the metal foreign object 400 drops down to the power transmitting coil 110.

Figure 7A:
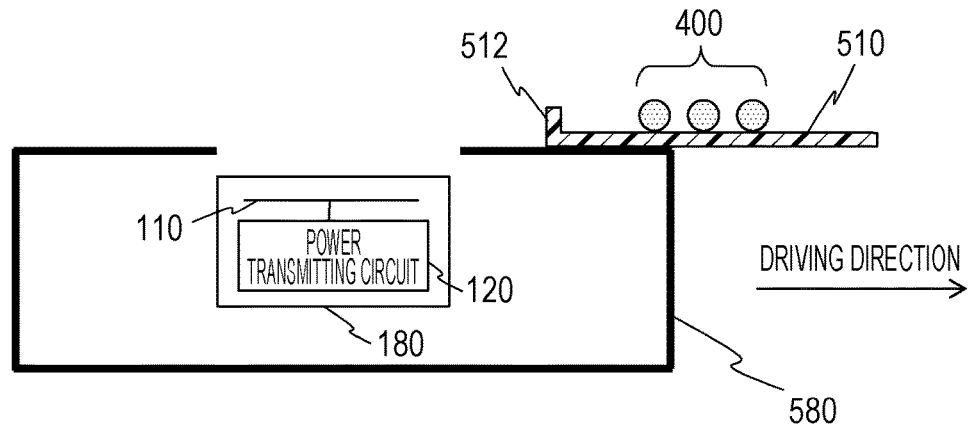
FIG. 7A is a diagram illustrating a mode in which the mobile member moves in a driving direction of the mobile object before transmission of power.
Figure 7B:
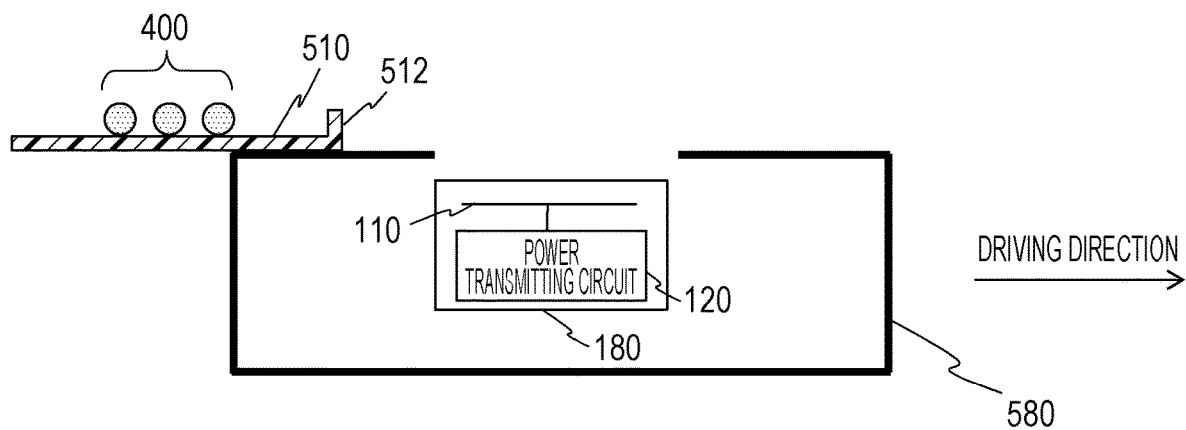
FIG. 7B is a diagram illustrating a mode in which the mobile member moves in a direction opposite the driving direction of the mobile object before transmission of power.
Figure 7C:
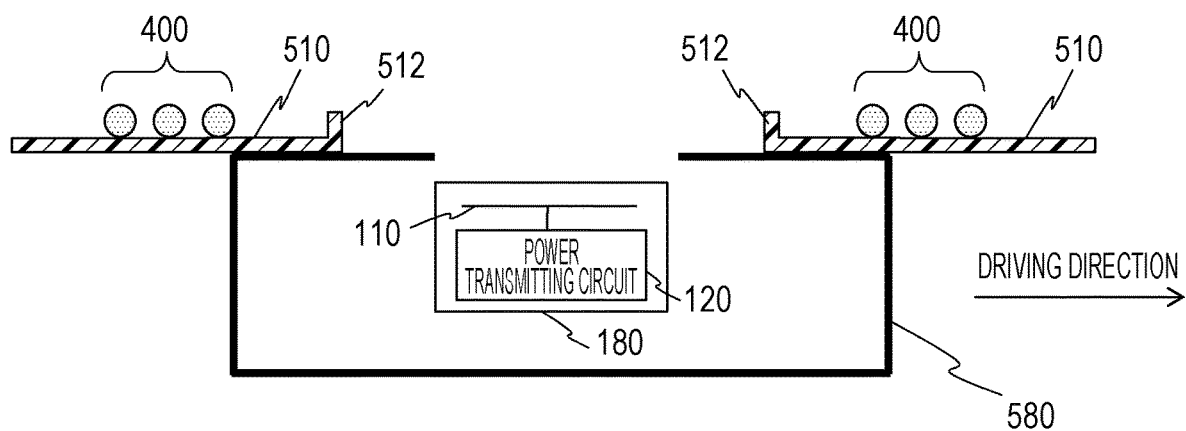
FIG. 7C is a diagram illustrating a mode in which two mobile members move in the driving direction of the mobile object and the direction opposite the driving direction, respectively, before transmission of power.

FIGS. 7A to 7C are cross-sectional views schematically illustrating variations of arrangement of the mobile member 510. FIG. 7A illustrates a mode in which the mobile member 510 moves in a driving direction of the mobile object 200 before transmission of power. FIG. 7B illustrates a mode in which the mobile member 510 moves in a direction opposite the driving direction of the mobile object 200 before transmission of power. FIG. 7C illustrates a mode in which two mobile members 510 move in the driving direction of the mobile object 200 and the direction opposite the driving direction, respectively, before transmission of power. The mobile member(s) 510 may thus be arranged in various manners. As illustrated in FIG. 7C, the power transmitting device 100 may include a plurality of mobile members 510.

In these examples, the mobile member 510 includes the stopper 512 at the end thereof opposite the movement direction. The stopper 512 may be provided at another end of the mobile member 510, instead. If the mobile member 510 includes a rectangular platelike member at the bottom surface thereof, for example, the platelike member may be provided with stoppers 512 (e.g., side walls) at all of four sides thereof.

Figure 8A:
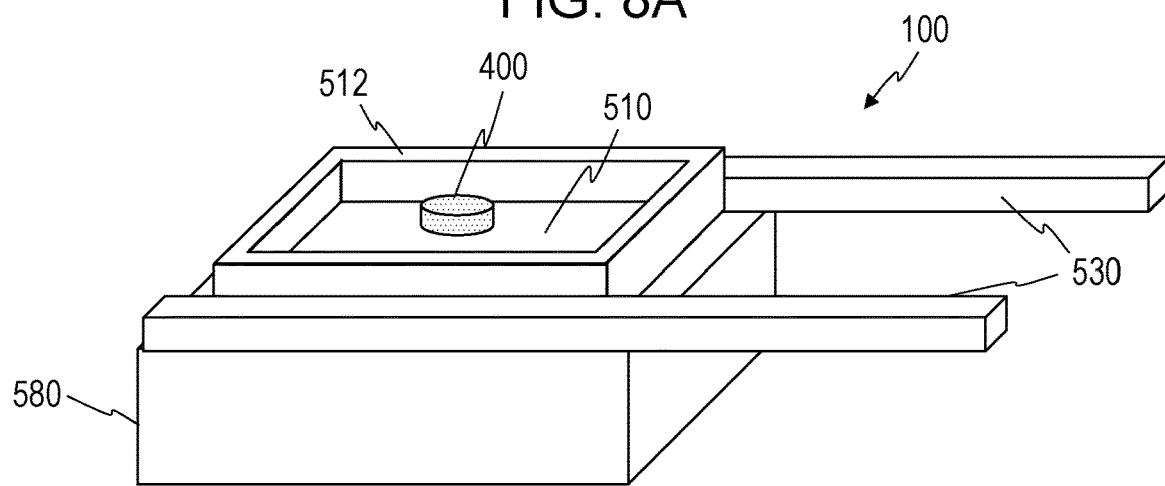
FIG. 8A is a diagram illustrating a state where the mobile member surrounded by side walls covers the power transmitting coil.
Figure 8B:
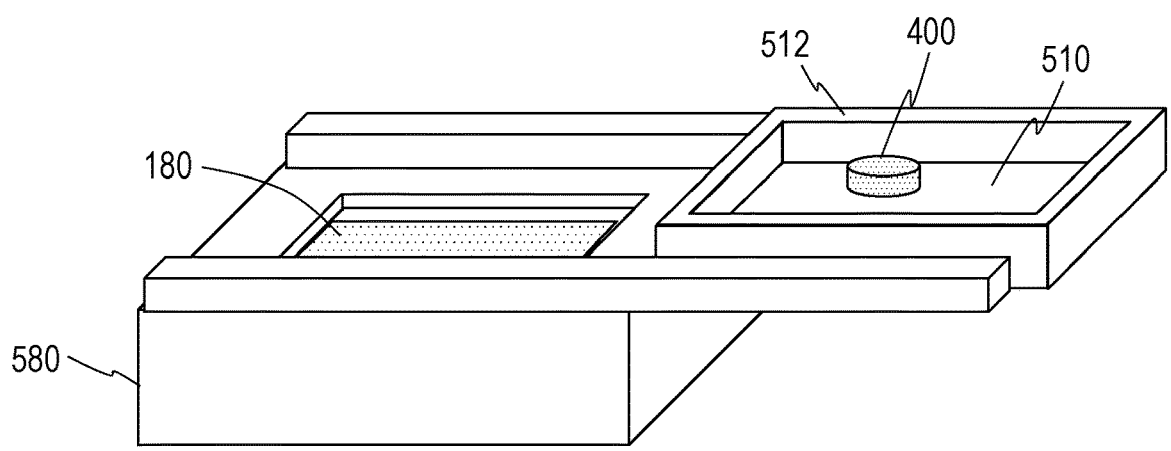
FIG. 8B is a diagram illustrating a state after the mobile member surrounded by the side walls moves from a position overlapping the power transmitting coil.

FIGS. 8A and 8B are perspective views illustrating an example of a configuration in which the mobile member 510 includes stoppers 512 at all of the four sides thereof. FIG. 8A illustrates a state where the mobile member 510 covers the power transmitting coil 110. FIG. 8B illustrates a state after the mobile member 510 moves from a position overlapping the power transmitting coil 110. Although the mobile member 510 is surrounded by the stoppers 512 (side walls), an upper surface of the mobile member 510 is open. With this configuration, since the mobile member 510 is surrounded by the stoppers 512 (side walls), the possibility that the metal foreign object 400 might drop can be further reduced.

In the above example, the case 580 of the power transmitting coil 110 includes the opening 515. The case 580, however, need not include the opening 515. In addition, the mobile member 510 need not include the stopper 512.

Figure 8C:
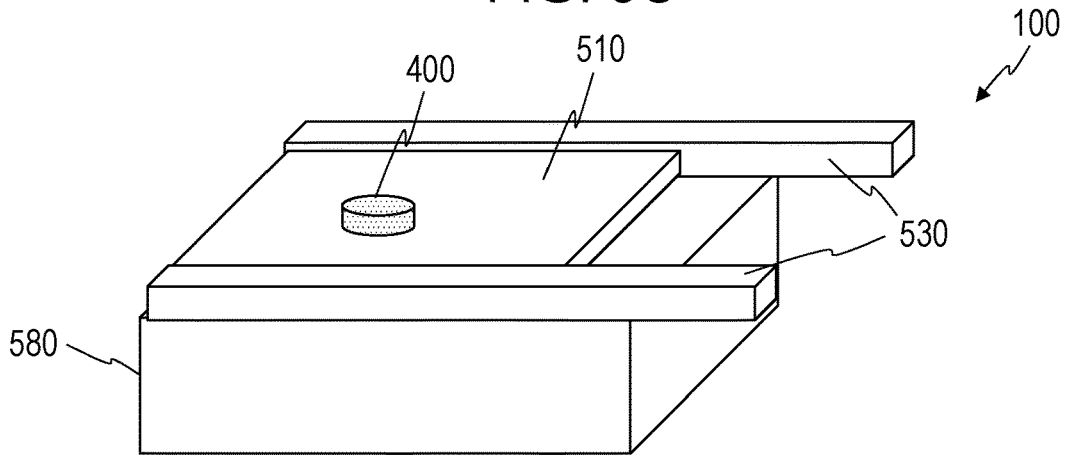
FIG. 8C is a first diagram schematically illustrating an example of a configuration in which the case does not include an opening and the mobile member does not include stoppers.
Figure 8D:
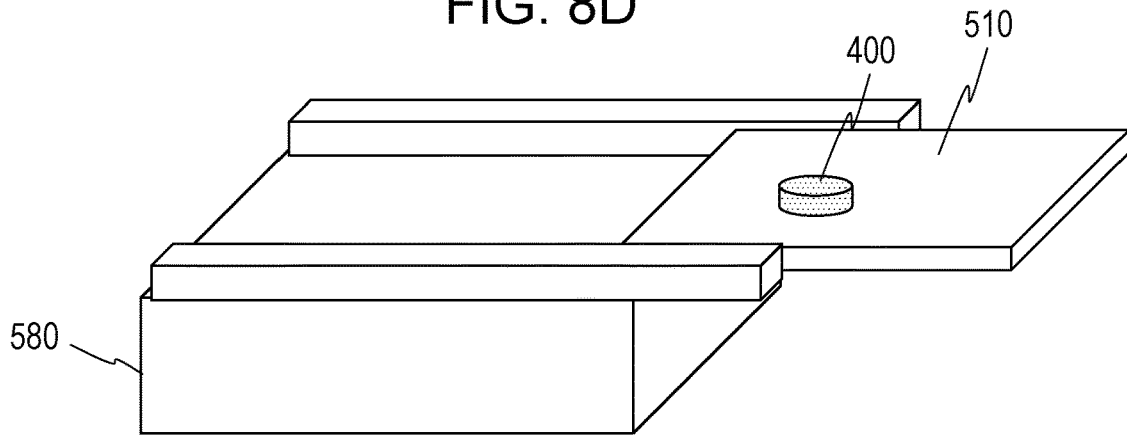
FIG. 8D is a second diagram schematically illustrating the example of the configuration in which the case does not include an opening and the mobile member does not include stoppers.

FIGS. 8C and 8D schematically illustrate an example of a configuration in which the case 580 does not include the opening 515 and the mobile member 510 does not include the stopper 512. FIG. 8C illustrates a state where the mobile member 510 is closed. FIG. 8D illustrates a state where the mobile member 510 is open. The mobile member 510 is a platelike member in this example. Since there is no opening in the case 580, the metal foreign object 400 does not enter the case 580 through an opening while the mobile member 510 is open.

A material and/or a shape of an upper surface of the case 580 are preferably selected or designed such that the temperature of the upper surface of the case 580 does not exceed a certain degree, namely, for example, 50 or 40 degrees Celsius, due to heat caused by power output from the power transmitting coil 110. The upper surface of the case 580 is preferably composed, for example, of a non-metal material or a non-magnetic material such as a resin. In this example, the case 580 may function as the power transmitting circuit case 180 illustrated in FIG. 5C. That is, the power transmitting circuit case 180 need not be separately provided inside the case 580.

Figure 8E:
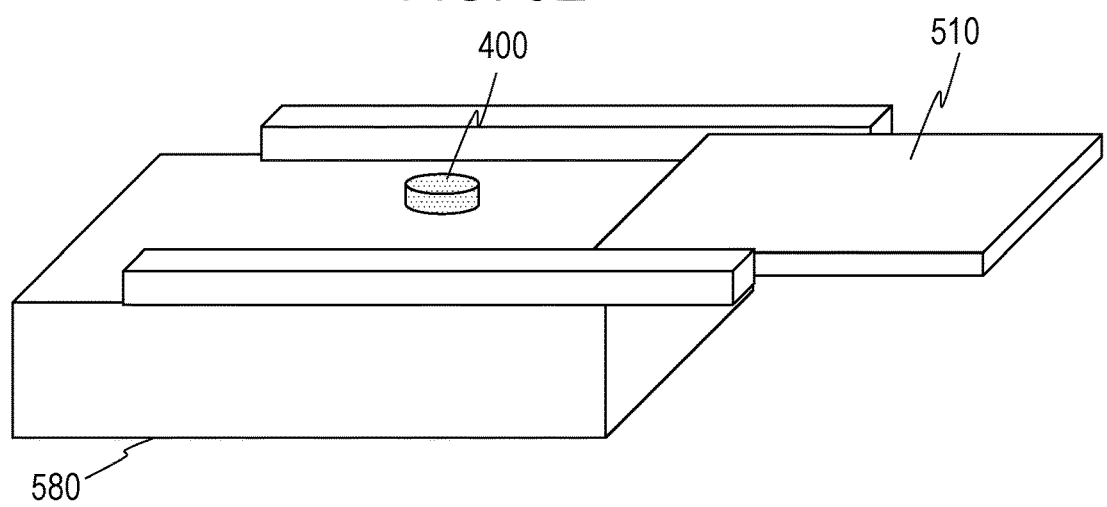
FIG. 8E is a diagram illustrating an example of a state where there is a metal foreign object on the case when the mobile member returns to an original position after moving to a position not overlapping the power transmitting coil.
Figure 8F:
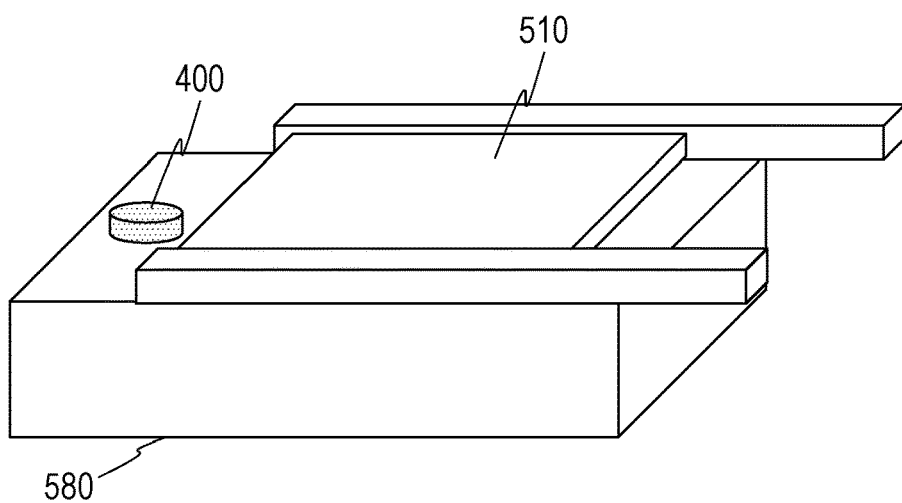
FIG. 8F is a diagram illustrating a state where the metal foreign object has been pushed by an end of the mobile member and moved to a position not overlapping the power transmitting coil from a position overlapping the power transmitting coil.

When the mobile member 510 returns to an original position from a position not overlapping the power transmitting coil 110, there might be a metal foreign object 400 on the case 580. FIG. 8E illustrates an example of such a state. In this case, as illustrated in FIG. 8F, an end of the mobile member 510 pushes the metal foreign object 400 to a position not overlapping the power transmitting coil 110 from a position overlapping the power transmitting coil 110.

Figure 8G:
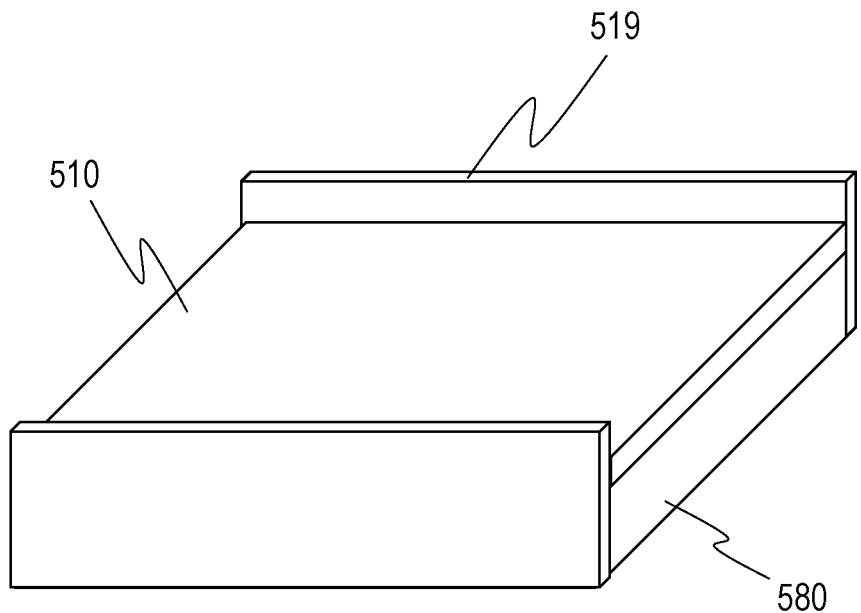
FIGS. 8GA and 8GB are diagrams illustrating a first modification of the power transmitting device according to the first embodiment.
Figure 8G:
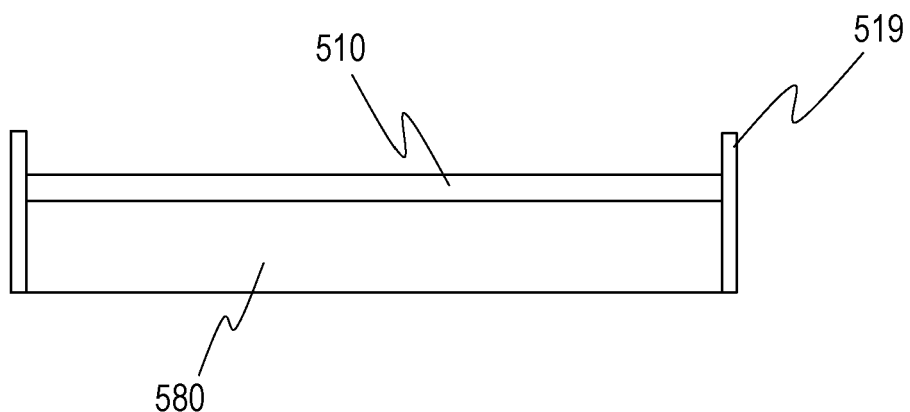

FIGS. 8GA and 8GB illustrate a first modification of the power transmitting device 100 illustrated in FIG. 8C. FIG. 8GA is a perspective view of a power transmitting device according to the present modification. FIG. 8GB is a right side view of FIG. 8GA. In the configuration illustrated in FIGS. 8GA and 8GB, unlike in the configuration illustrated in FIG. 8C, the length of the mobile member 510 in a movement direction (i.e., a horizontal direction in FIG. 8G) of the mobile member 510 is essentially the same as that of the case 580 in the movement direction. A foreign object therefore does not get on the case 580. When two lengths are essentially the same as each other herein, a ratio of the two lengths falls within a range of 0.99 (99%) to 1.01 (101%).

The mobile member 510 may be longer or shorter than the case 580 in the movement direction thereof. In this case, a difference between the length of the upper surface of the case 580 and the length of the mobile member 510 in the movement direction is equal to or smaller than about 1 mm. In doing so, it becomes possible to effectively prevent a foreign object from getting on the case 580.

As illustrated in FIG. 8GB, the mobile member 510 and the upper surface of the case 580 are in contact with each other in the present modification. When the mobile member 510 is at an original position, the mobile member 510 does not protrude from the case 580. Even if a vehicle runs on the mobile member 510, therefore, the mobile member 510 does not break easily. In addition, when the mobile member 510 is at the original position, a foreign object is prevented from getting on the case 580.

In the modification illustrated in FIGS. 8GA and 8GB, the mobile member 510 includes two control boards 519 that prevent foreign objects from dropping from the mobile member 510. The two control boards 519 are provided at both ends of the mobile member 510. The control boards 519 have a platelike shape and are substantially parallel to the movement direction of the control boards 519. The control boards 519 prevent foreign objects from moving in a perpendicular direction. By providing the control boards 519, foreign objects on the mobile member 510 do not easily drop from the mobile member 510 while the mobile member 510 is moving. In the example illustrated in FIGS. 8GA and 8GB, the control boards 519 have a function of guiding the mobile member 510. In the example illustrated in FIGS. 8GA and 8GB, the control boards 519 can be composed, for example, of an insulating material such as a resin or wood or a non-magnetic metal such as aluminum. The control boards 519 may be composed of an elastic material such as rubber, instead. When the control boards 519 are not affected by a magnetic field, the control boards 519 may be composed of a metal such as stainless steel. Although the control boards 519 are provided in the example illustrated in FIGS. 8GA and 8GB, one or three or more control boards 519 may be provided, instead. That is, the mobile member 510 can include at least one control board 519. In the example illustrated in FIGS. 8GA and 8GB, the control boards 519 are taller than the case 580 and the mobile member 510 stacked together. Upper ends of the control boards 519 are higher than the upper surface of the mobile member 510.

Figure 8H:
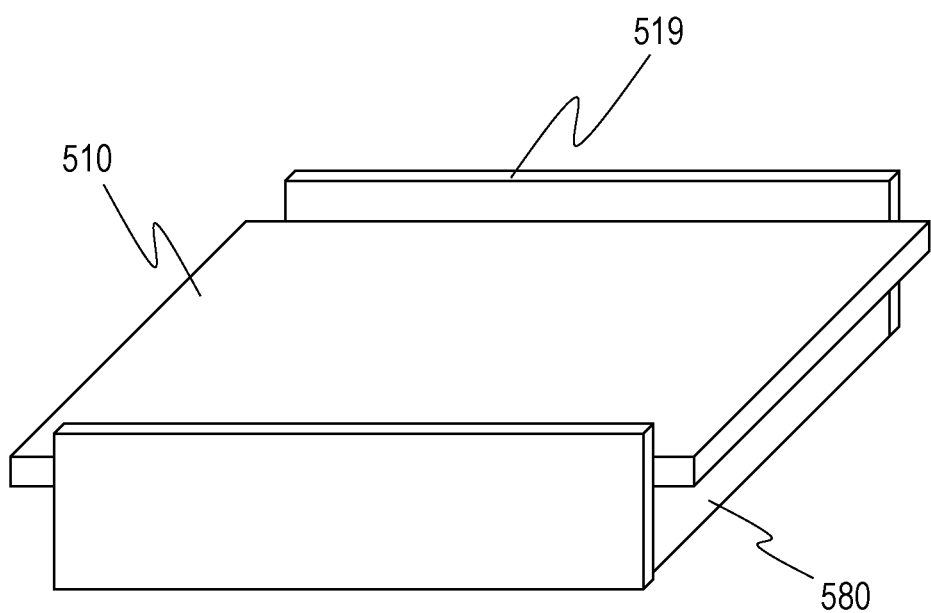
FIG. 8H is a diagram illustrating a second modification of the power transmitting device according to the first embodiment.

FIG. 8H illustrates a second modification of the power transmitting device 100 illustrated in FIG. 8C. In a configuration illustrated in FIG. 8H, unlike in the configuration illustrated in FIG. 8G, the mobile member 510 is longer than the case 580 in the movement direction thereof.

As a result, when the mobile member 510 is at the original position, it is easier to prevent a foreign object from entering than in the first modification illustrated in FIGS. 8GA and 8GB.

Figure 8I:
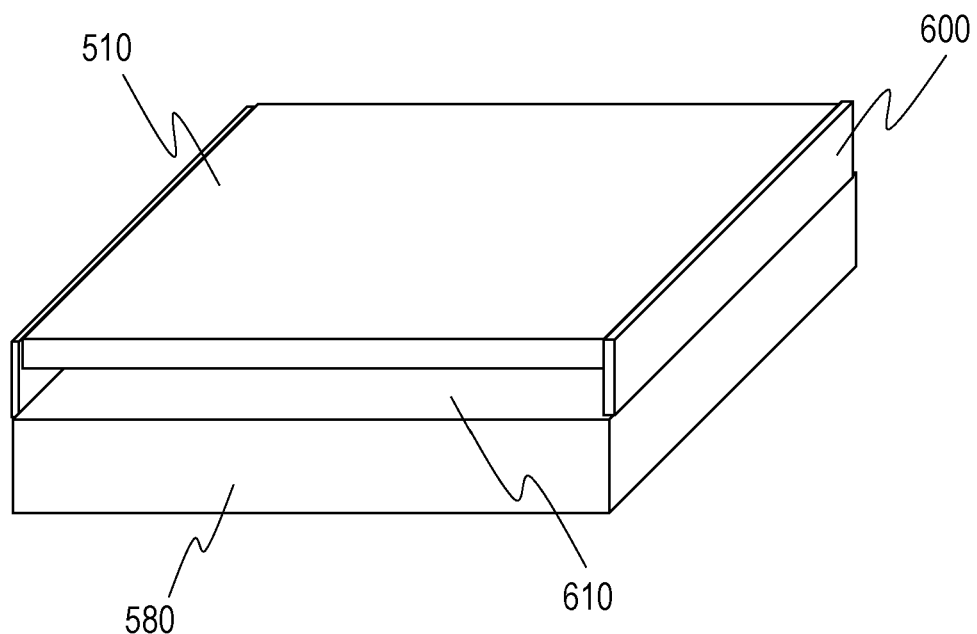
FIGS. 8IA and 8IB are diagrams illustrating a third modification of the power transmitting device according to the first embodiment.
Figure 8I:
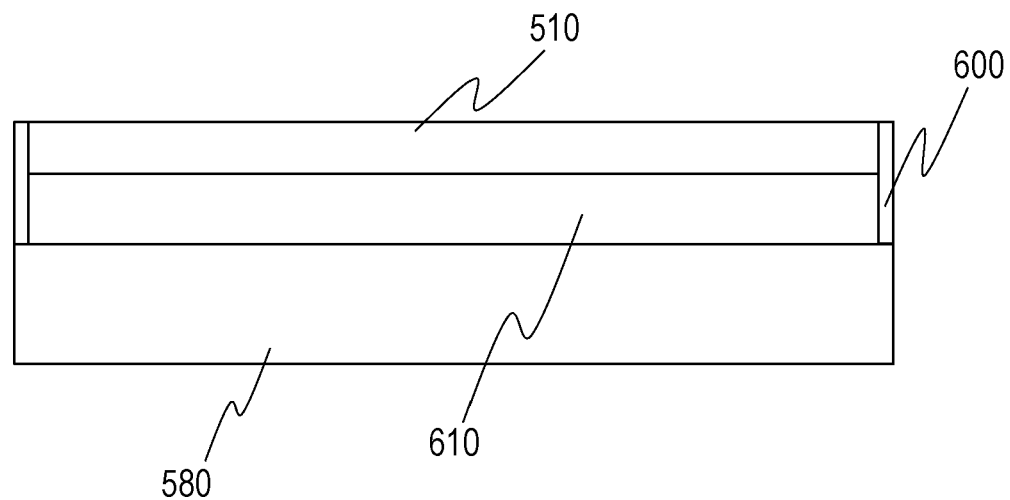

FIGS. 8IA and 8IB illustrate a third modification of the power transmitting device 100 illustrated in FIG. 8C. FIG. 8IA is a perspective view illustrating a power transmitting device according to the present modification. FIG. 8IB is a side view of the power transmitting device according to the present modification. The mobile member 510 according to the present modification includes foreign object removal members 600 at both ends in the movement direction. The foreign object removal members 600 have, for example, a platelike shape. A material of the foreign object removal members 600 can be, for example, an insulating material such as a resin or wood or a non-magnetic metal such as aluminum so that the foreign object removal members 600 are not heated due to a magnetic field. The foreign object removal members 600 may be composed of an elastic material such as rubber. When the foreign object removal members 600 are not affected by a magnetic field, the foreign object removal members 600 may be composed of a metal such as stainless steel. Lower ends of the foreign object removal members 600 according to the present modification and the upper surface of the case 580 are in contact with each other so that foreign objects do not enter. When thick foreign objects are to be removed, the lower ends of the foreign object removal members 600 and the upper surface of the case 580 need not be in contact with each other. That is, there may be gaps between the foreign object removal members 600 and the case 580. As illustrated in FIGS. 8IA and 8IB, there may be a space 610 between the two foreign object removal members 600, that is, between the mobile member 510 and the case 580.

In the present modification, when the mobile member 510 is at the original position, foreign objects are prevented from getting on the case 580. Furthermore, even if a foreign object gets on the case 580 after the mobile member 510 moves to a position not overlapping the power transmitting coil 110, the foreign object can be removed by the foreign object removal members 600. Because areas in which the lower ends of the foreign object removal members 600 and the upper surface of the case 580 are in contact with each other are small, frictional force is small, and required motor driving torque is also small.

Figure 8J:
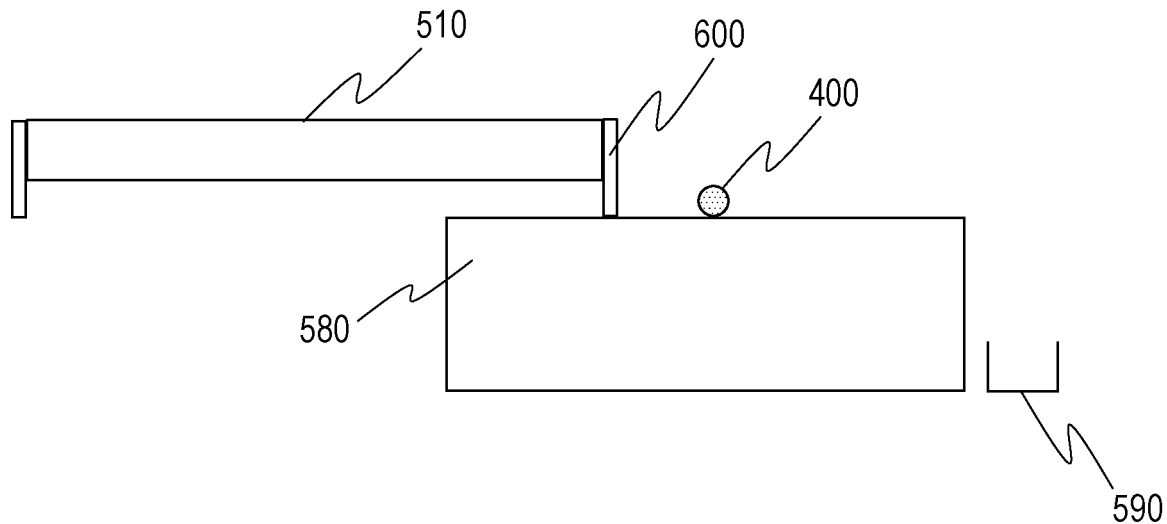
FIGS. 8JA to 8JC are diagrams illustrating an example of the operation of the power transmitting device.
Figure 8J:
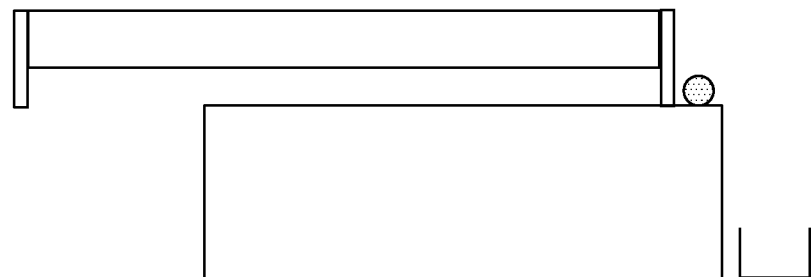
Figure 8J:
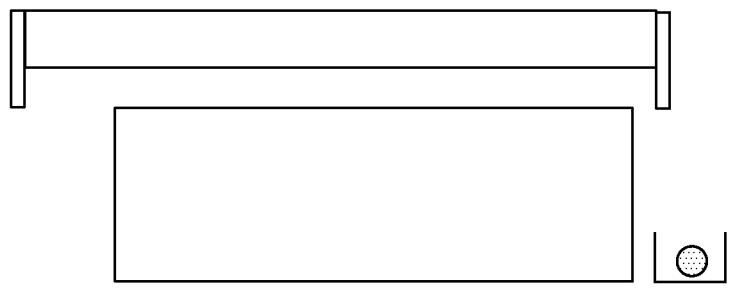

An operation for removing a foreign object in the configurations according to the first to third modifications will be described with reference to FIGS. 8JA to 8K. The operation is performed by a power transmission control circuit 150 (refer to FIG. 9), which will be described later. FIGS. 8JA to 8JC illustrate an operation in the configuration illustrated in FIGS. 8IA and 8IB as a representative operation. The operation illustrated in FIGS. 8JA to 8JC also applies when the configuration illustrated in FIGS. 8GA and 8GB or FIG. 8H is employed.

As illustrated in FIGS. 8JA to 8JC, the power transmitting device in this example includes a vessel 590 near the case 580. The case 580 extends in a vertical direction of FIGS. 8JA to 8JC. As illustrated in FIG. 8JA, it is assumed that the metal foreign object 400 gets on the case 580 after the mobile member 510 moves from a position overlapping the power transmitting coil 110 to a position not overlapping the power transmitting coil 110. In this case, as illustrated in FIG. 8JB, the metal foreign object 400 is pushed off by one of the foreign object removal members 600 and drops from the case 580 as illustrated in FIG. 8JC. The metal foreign object 400 is then stored in the vessel 590 as illustrated in FIG. 8JC.

Figure 8K:
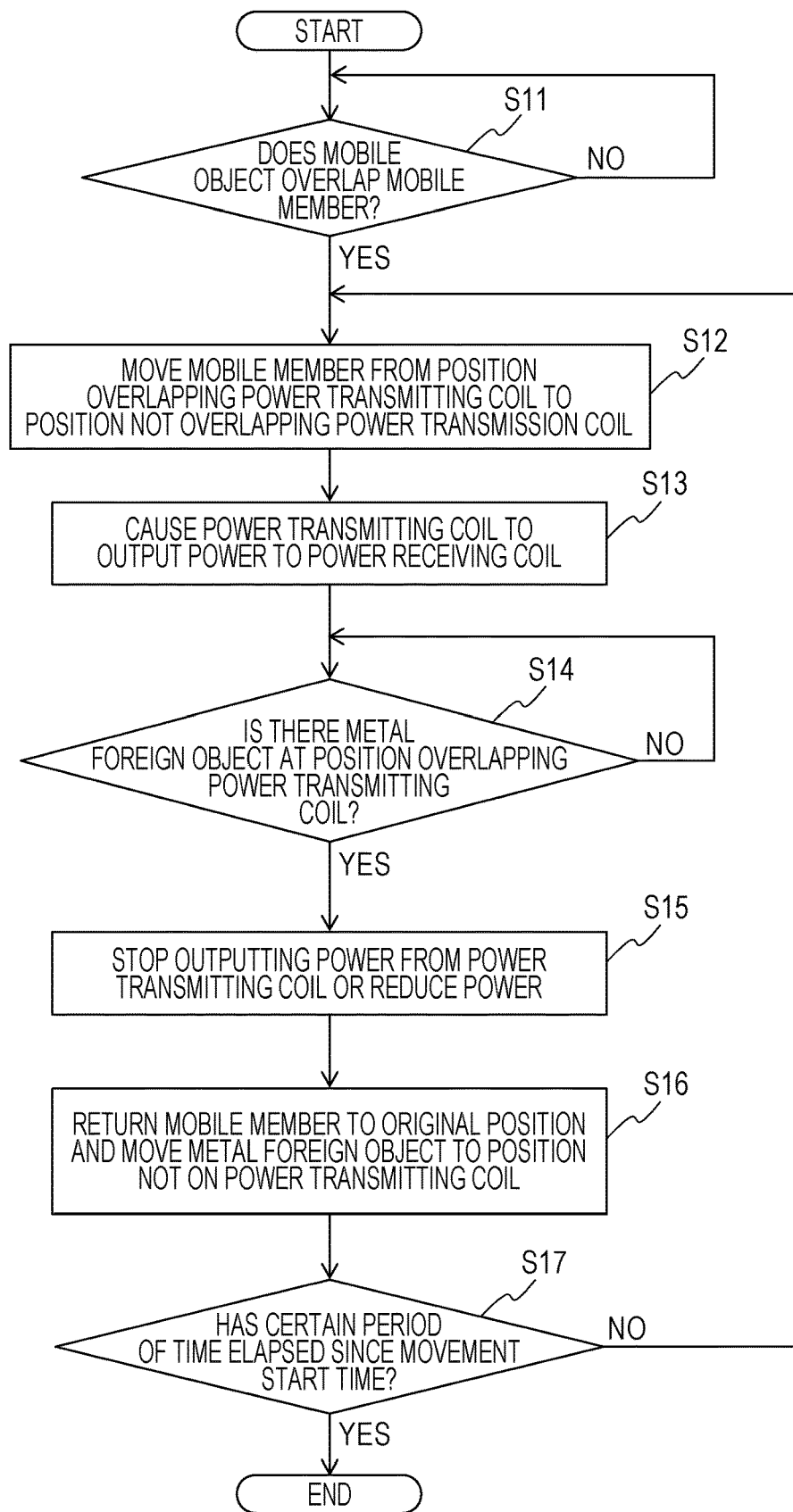
FIG. 8K is a flowchart illustrating an example of the operation of the power transmitting device.

FIG. 8K is a flowchart illustrating an example of the operation of the power transmission control circuit. In this example, first, the power transmission control circuit determines whether the mobile object 200 overlaps the mobile member 510 (step S11). If a result of the determination is positive, the power transmission control circuit moves the mobile member 510 from a position overlapping the power transmitting coil 110 to a position not overlapping the power transmitting coil 110 (step S12). Next, the power transmission control circuit causes the power transmitting coil 110 to output power (step S13). That is, the power transmission control circuit starts transmission of power from the power transmitting coil 110 to the power receiving coil 210. Steps S11 to S13 illustrated in FIG. 8K are the same as steps S101 to S103, respectively, illustrated in FIGS. 15A and 15B, which will be described later. Details of these steps will be described later.

FIG. 8JA illustrates a state in step S13 illustrated in FIG. 8K, that is, a state where the metal foreign object 400 has gotten on the case 580 with the power transmitting coil 110 outputting power to the power receiving coil 210. The mobile member 510 is located at a left end. The vessel 590 for collecting foreign objects is provided to the right of the case 580. The metal foreign object 400 is located at the center of the upper surface of the case 580.

After the power transmitting coil 110 outputs power to the power receiving coil 210, the power transmission control circuit determines whether there is a metal foreign object at a position overlapping the power transmitting coil 110 (S14).

Whether there is a metal foreign object can be determined by a known method. A method such as detection of a decrease in power transmission efficiency (i.e., a ratio of received power to transmitted power), detection of an increase in the temperature of an area near the power receiving coil 210, or detection of a foreign object by a camera, for example, may be used.

If a result of the determination in step S14 is negative, the determination in step S14 is repeated at certain time intervals. The transmission of power continues until the metal foreign object 400 is detected. If an instruction to stop transmitting power is issued during the transmission of power, the power transmission control circuit stops the outputting of power from the power transmitting coil 110 and ends the process. The instruction to stop the transmitting power can be, for example, a notification that is transmitted from the power receiving device and that indicates that charging has been completed.

If the result of the determination in step S14 is positive, the power transmission control circuit stops outputting power from the power transmitting coil 110 or reduces power (step S15). The power transmission control circuit then returns the mobile member 510 to an original position and moves the metal foreign object 400 to a position not overlapping the power transmitting coil 110 (S16). That is, the power transmission control circuit drops the metal foreign object 400 from the upper surface of the case 580 by moving the mobile member 510 from the position not overlapping the power transmitting coil 110 to a position overlapping the power transmitting coil 110. FIGS. 8JB and 8JC illustrate an operation at this time.

Next, the power transmission control circuit determines whether a certain period of time has elapsed since the mobile member 510 began to move (T1) (S17). The certain period of time can be a period of time taken until an instruction to stop transmitting power due to completion of charging is issued after the movement start time (T1). Alternatively, the certain period of time may be a period of time taken until a vehicle starts after the movement start time (T1). The certain period of time may be any value insofar as the certain period of time relates to the movement start time (T1).

If a result of the determination in step S17 is positive, the power transmission control circuit returns the mobile member 510 to the original position and ends the operation. If the result of the determination in step S17 is negative, the operation returns to step S12.

As a result of the operation illustrated in FIG. 8K, the metal foreign object 400 is pushed off by one of the foreign object removal members 600, which are provided at both ends of the mobile member 510, drops from the case 580, and is stored in the vessel 590. Heating of the metal foreign object 400 can thus be prevented.

Since the areas in which the lower ends of the foreign object removal members 600 and the upper surface of the case 580 are in contact with each other are small, frictional force is small. As a result, motor driving torque required to remove the metal foreign object 400 is small.

In the example illustrated in FIGS. 8IA to 8JC, the mobile member 510 includes the foreign object removal members 600 at both ends thereof in the movement direction thereof. The mobile member 510 may include a foreign object removal member 600 only at a forward end (i.e., an end closer to the vessel 590) in the movement direction, instead. When the foreign object removal members 600 are provided, a foreign object that has gotten on the case 580 during transmission of power can be removed from the case 580.

In order to remove the metal foreign object 400 more certainly, an opening may be provided in the case 580. Furthermore, as described in the second embodiment, a mechanism for removing a foreign object may be provided inside the case 580.

Next, the configuration of the wireless power transmission system according to the present embodiment will be described in more detail.

Figure 9:
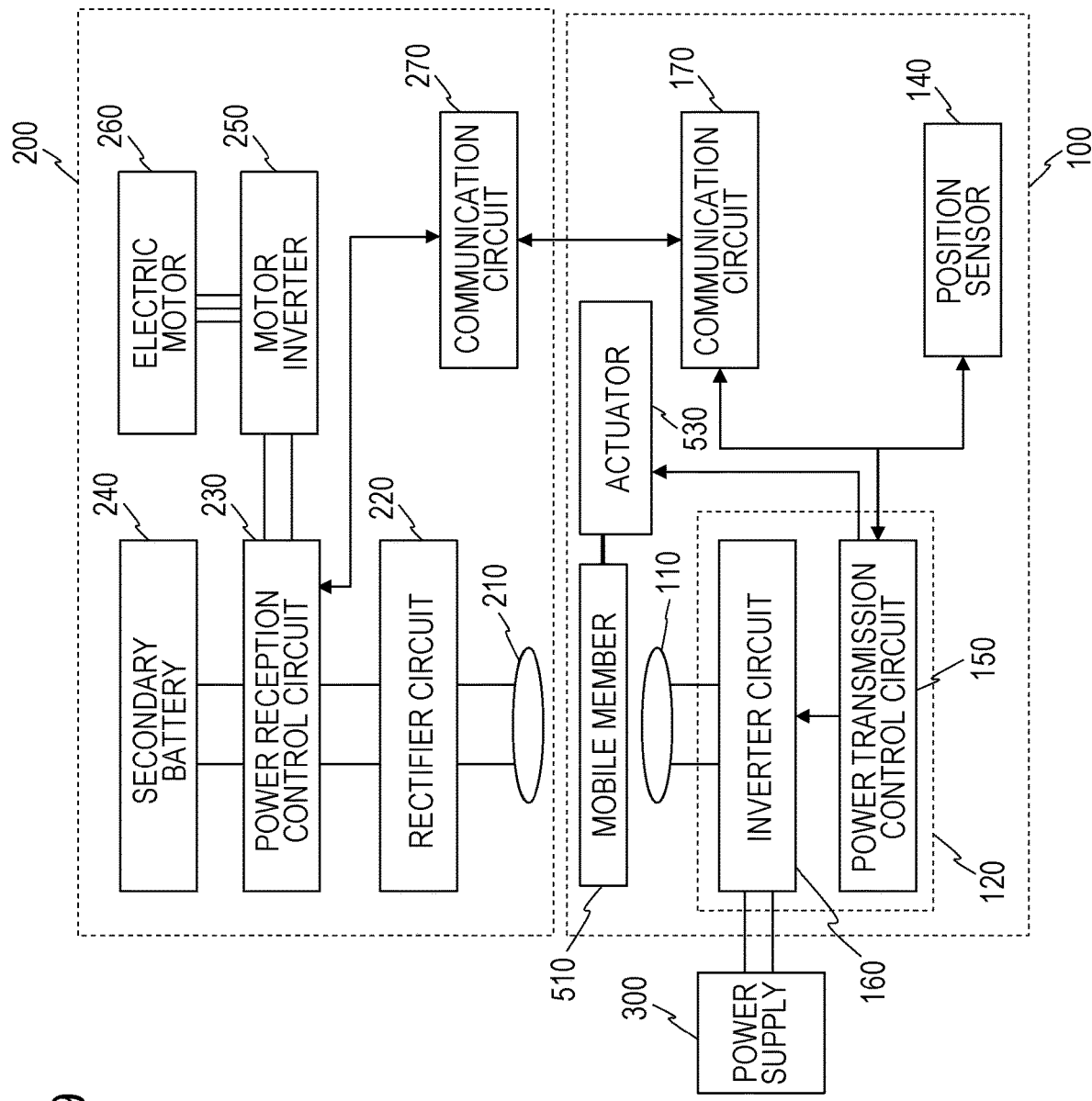
FIG. 9 is a block diagram illustrating an example of the configuration of the wireless power transmission system according to the first embodiment.

FIG. 9 is a block diagram illustrating an example of the configuration of the wireless power transmission system according to the present embodiment. A power transmitting device 100 includes a communication circuit 170 as well as the power transmitting coil 110, the power transmitting circuit 120, the position sensor 140, the mobile member 510, and the actuator 530. The power transmitting circuit 120 includes an inverter circuit 160 and a power transmission control circuit 150. The inverter circuit 160 is connected between an external power supply 300 and the power transmitting coil 110. The inverter circuit 160 converts direct current power supplied from the power supply 300 into alternating current power and supplies the alternating current power to the power transmitting coil 110. The power transmission control circuit 150 controls the inverter circuit 160, the communication circuit 170, the position sensor 140, and the actuator 530. The power transmission control circuit 150 controls on/off states of a plurality of switching devices of the inverter circuit 160, for example, such that the inverter circuit 160 outputs alternating current power having a desired frequency and a desired voltage. The power transmission control circuit 150 also controls the actuator 530 to change a position of the mobile member 510. The communication circuit 170 communicates signals with a communication circuit 270 of the mobile object 200. The position sensor 140 measures positions of the mobile object 200 and the power transmitting device 100.

The mobile object 200 includes the power receiving coil 210, a rectifier circuit 220, a power reception control circuit 230, a secondary battery 240, the communication circuit 270, an electric motor 260, and a motor inverter 250. The rectifier circuit 220, which is connected to the power receiving coil 210, converts alternating current power output from the power receiving coil 210 into direct current power and outputs the direct current power.

The electric motor 260 drives the mobile object 200 and is driven, for example, by three-phase alternating current power. The motor inverter 250 converts supplied direct current power into three-phase alternating current power and supplies the three-phase alternating current power to the electric motor 260. The power reception control circuit 230 charges the secondary battery 240 with the direct current power output from the rectifier circuit 220 and controls the motor inverter 250 and the communication circuit 270.

When the amount of charge of the secondary battery 240 has become small, the mobile object 200 in the present embodiment approaches the power transmitting device 100 for charging.

The power transmission control circuit 150 drives the inverter circuit 160 to start to transmit power. Power transmitted through magnetic field coupling between the power transmitting coil 110 and the power receiving coil 210 is stored in the secondary battery 240. After the secondary battery 240 is charged, the mobile object 200 begins to run again by driving the electric motor 260 using the power stored in the secondary battery 240.

The position sensor 140 measures relative positions of the power transmitting device 100 and the mobile object 200 using light, radio waves, pressure, sound waves, or the like. The position sensor 140 may be a common image sensor or a distance measuring device such as a time-of-flight (TOF) sensor.

Figure 10A:
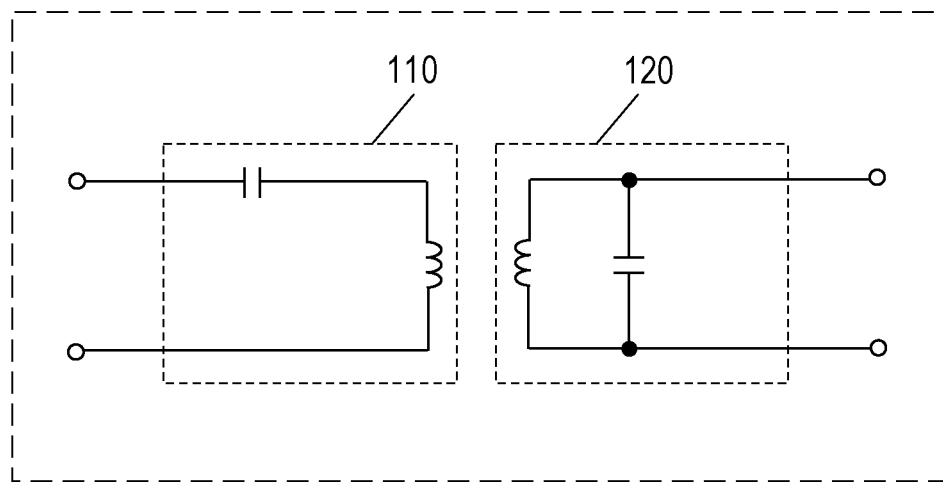
FIG. 10A is a diagram illustrating an example of equivalent circuits of the power transmitting coil and the power receiving coil.
Figure 10B:
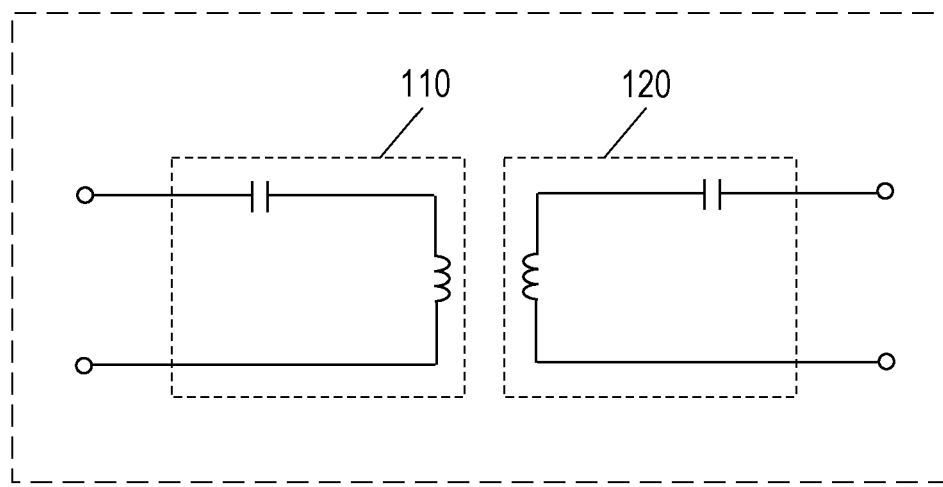
FIG. 10B is a diagram illustrating another example of the equivalent circuits of the power transmitting coil and the power receiving coil.

FIG. 10A is a diagram illustrating an example of equivalent circuits of the power transmitting coil 110 and the power receiving coil 210. In this example, the power transmitting coil 110 functions as a series resonant circuit, and the power receiving coil 210 functions as a parallel resonant circuit. FIG. 10B is a diagram illustrating another example of the equivalent circuits of the power transmitting coil 110 and the power receiving coil 210. In this example, both the power transmitting coil 110 and the power receiving coil 210 function as series resonant circuits. In a yet another example, the power transmitting coil 110 can function as a parallel resonant circuit, and the power receiving coil 210 can function as a series resonant circuit.

Each coil can be a planar coil or a multilayer coil or can be a winding coil made of copper wire, Litz wire, twisted wire, or the like. The capacitance component of each resonant circuit may be achieved by the parasitic capacitance of a coil, or a capacitor having a chip shape or a lead shape, for example, may be separately provided.

A resonant frequency f0 of each resonant circuit is typically set at a transmission frequency f for transmission of power. The resonant frequency f0 of each resonant circuit need not strictly match the transmission frequency f. The resonant frequency f0 of each resonant circuit may be set within a range of 50% to 150%, for example, of the transmission frequency f. The transmission frequency f can be set within a range of 50 Hz to 300 GHz, preferably within a range of 20 kHz to 10 GHz, more preferably within a range of 20 kHz to 20 MHz, even more preferably within a range of 20 kHz to 7 MHz.

Although resonant circuits are used in the present embodiment, an inductive coupling method that does not employ resonance or a method employing microwaves may be used, instead.

Figure 11A:
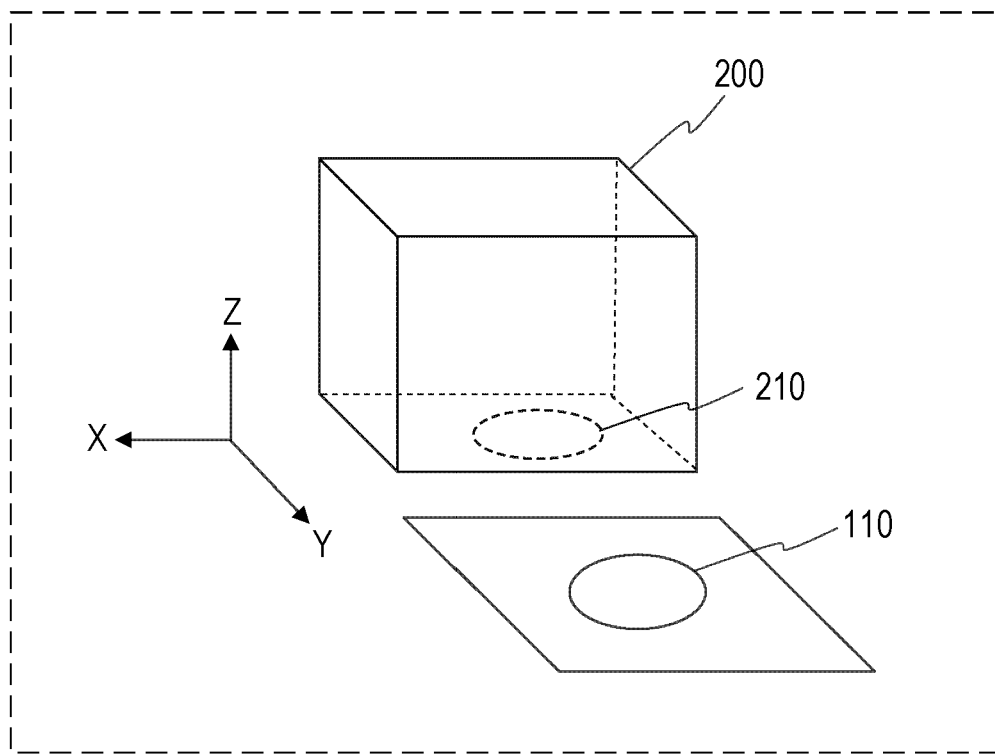
FIG. 11A is a diagram illustrating an example in which the power transmitting coil is arranged along a road surface.
Figure 11B:
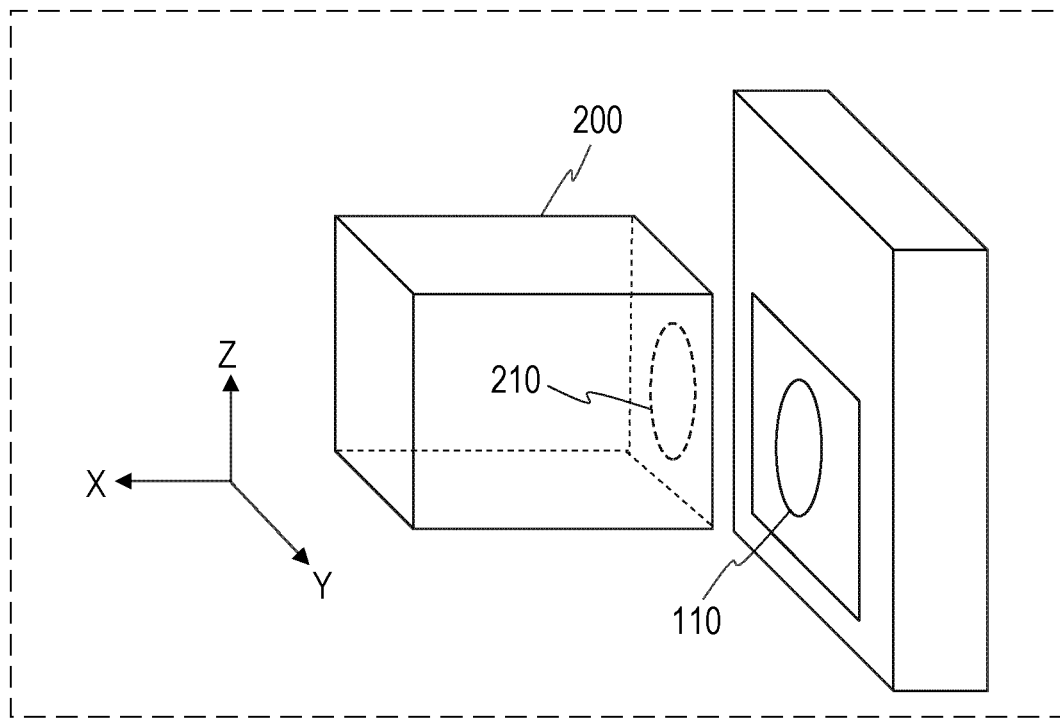
FIG. 11B is a diagram illustrating an example in which the power transmitting coil is arranged on a wall surface that intersects (perpendicular in the illustrated example) with the road surface.

FIGS. 11A and 11B are diagrams illustrating examples of the arrangement of the power transmitting coil 110 and the power receiving coil 210. FIG. 11A illustrates an example in which the power transmitting coil 110 is arranged along the road surface. Such a configuration is suitable when, as in the present embodiment, power is supplied to a vehicle including the power receiving coil 210 on a bottom surface thereof, such as an EV. FIG. 11B illustrates an example in which the power transmitting coil 110 is arranged on a wall surface that intersects (perpendicular in the illustrated example) with the road surface. In this example, the power receiving coil 210 can be provided on a surface (e.g., a side surface of the mobile object 200) that intersects with the road surface. That is, the power transmitting coil 110 and the power receiving coil 210 need not be arranged parallel to the road surface.

Figure 12:
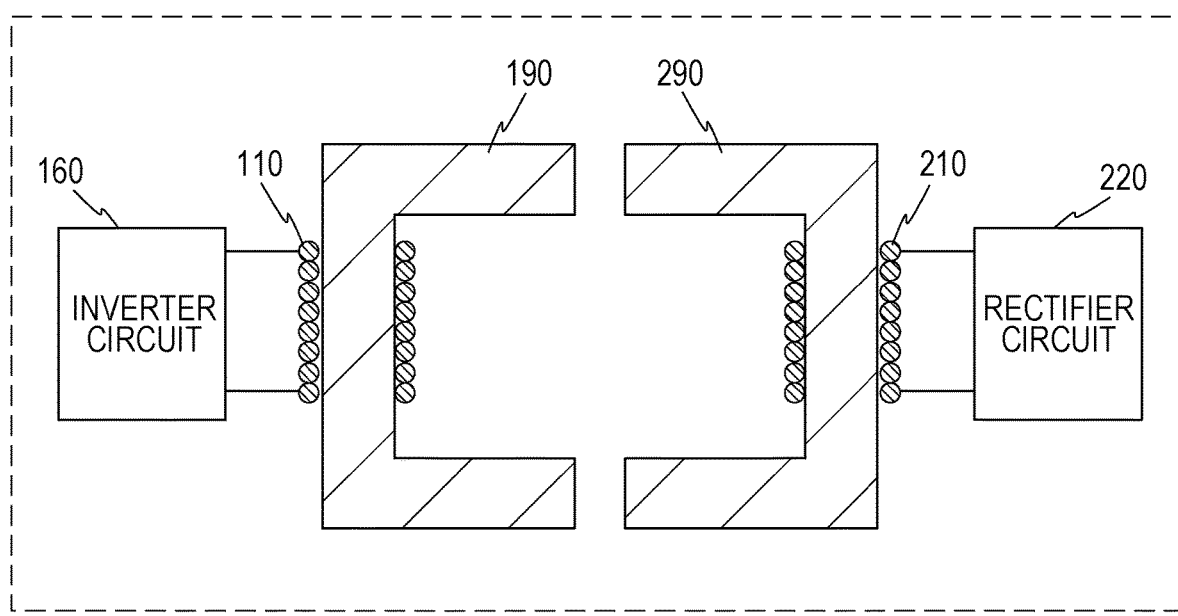
FIG. 12 is a diagram schematically illustrating another example of the power transmitting coil and the power receiving coil.

FIG. 12 is a diagram schematically illustrating another example of the power transmitting coil 110 and the power receiving coil 210. In this example, the power transmitting coil 110 and the power receiving coil 210 are wires wound around magnetic members 190 and 290, respectively. The two magnetic members 190 and 290 have symmetrical shapes and two ends. Surfaces of the two ends of the magnetic member 190 face surfaces of the two ends of the magnetic member 290. With this configuration, too, power transmission employing inductive coupling (magnetic field coupling) can be performed. Alternatively, the two magnetic members 190 and 290 may have asymmetrical shapes. The two magnetic members 190 and 290 may have the same shape or different shapes.

Figure 13A:
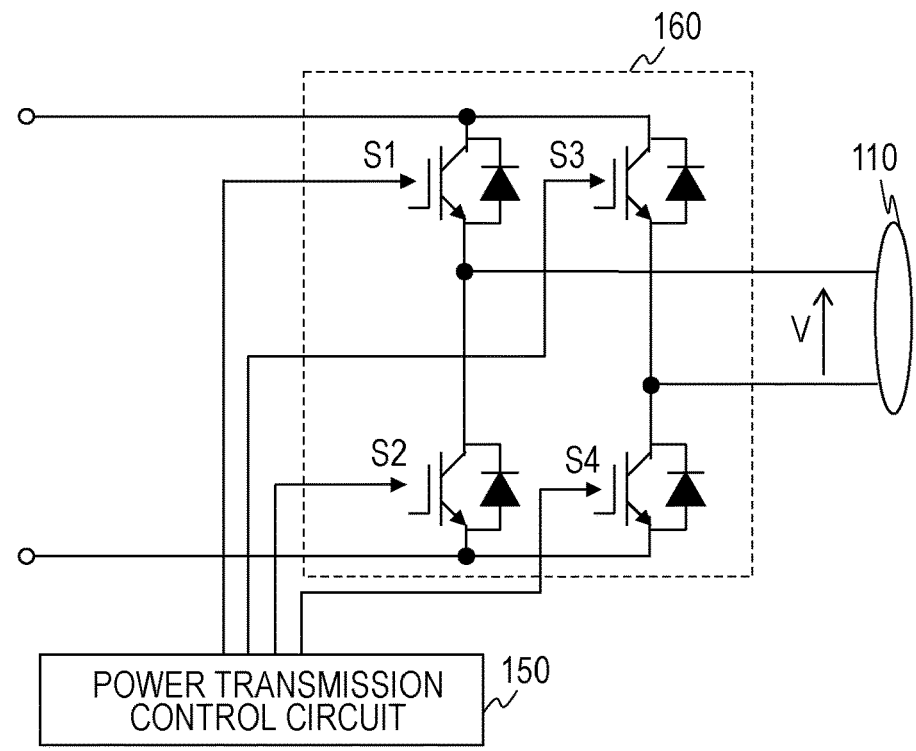
FIG. 13A is a diagram illustrating an example of the configuration of a full-bridge inverter circuit.
Figure 13B:
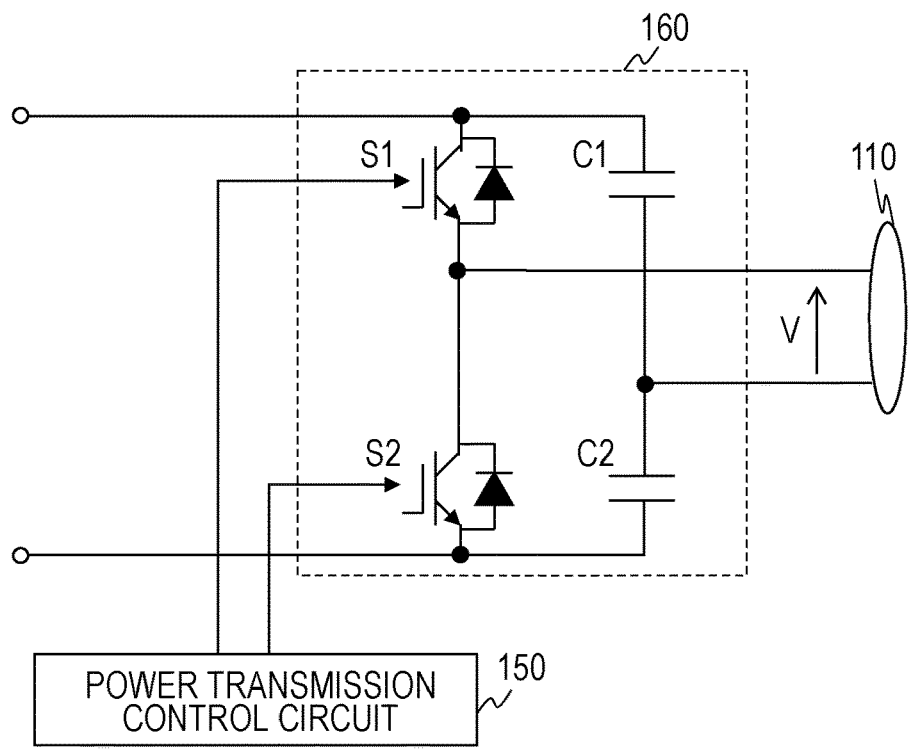
FIG. 13B is a diagram illustrating an example of the configuration of a half-bridge inverter circuit.

FIGS. 13A and 13B are diagrams illustrating examples of the configuration of the inverter circuit 160. FIG. 13A illustrates an example of the configuration of a full-bridge inverter circuit 160. In this example, the power transmission control circuit 150 converts input direct current power into alternating current power having a desired frequency f and a desired voltage V (effective value) by turning on or off four switching elements S1 to S4 included in the inverter circuit 160. FIG. 13B illustrates an example of the configuration of a half-bridge inverter circuit 160. In this example, the power transmission control circuit 150 converts input direct current power into alternating current power having the desired frequency f and the desired voltage V (effective value) by turning on or off two switching elements S1 and S2 included in the inverter circuit 160. The inverter circuit 160 may have a configuration different from those illustrated in FIGS. 13A and 13B, instead. For example, a Class E resonant circuit may be used.

The power transmission control circuit 150 and the power reception control circuit 230 can each be achieved by a circuit including a processor and a memory, such as a microcontroller unit (MCU). By executing computer programs stored in the memory, various types of control can be performed. The power transmission control circuit 150 and the power reception control circuit 230 may each be achieved by dedicated hardware configured to perform the operation according to the present embodiment.

The communication circuits 170 and 270 can communicate signals using, for example, a known wireless communication technique, optical communication technique, or modulation technique (frequency modulation, amplitude modulation, etc.). The communication circuits 170 and 270 may use any communication method.

The electric motor 260 can be a motor driven by three-phase alternating current power, such as a permanent magnet synchronous motor or an induction motor. The electric motor 260 may be a motor of another type, instead, such as a direct current motor. In this case, a motor driving circuit suitable for the configuration of the electric motor 260 is used instead of the motor inverter 250, which is a three-phase inverter circuit.

The power supply 300 can be any power supply that outputs direct current power. The power supply 300 may be any power supply such as a commercial power supply, a primary battery, a secondary battery, a solar cell, a fuel cell, a universal serial bus (USB) power supply, a high-capacity capacitor (e.g., an electric double layer capacitor), or a voltage converter connected to a commercial power supply.

The secondary battery 240 can be any secondary battery such as a lithium-ion battery, a nickel-hydrogen battery, or a lead-based battery. A high-capacity capacitor (e.g., an electric double layer capacitor) may be used instead of the secondary battery 240.

Example of Operation

The operation of the power transmission control circuit 150 according to the present embodiment will be described in more detail hereinafter.

Means for detecting a metal foreign object held on the surface of the mobile member 510 can be, for example, a sensor such as a camera. A metal foreign object can be detected by processing an image (i.e., image data or an image signal) obtained by the sensor such as a camera.

The operation of the power transmission control circuit 150 significantly differs depending on whether there is means for detecting a metal foreign object held on the surface of the mobile member 510. FIG. 14A is a table indicating that a power supply method differs depending on whether there is means (metal object detection means) for detecting a metal foreign object held on the surface of the mobile member 510. FIG. 14B is a flowchart illustrating an outline of the operation of the power transmission control circuit 150. If there is no metal foreign object detection means, whether there is a metal foreign object held on the mobile member 510 is not determined. The power transmission control circuit 150 therefore moves the mobile member 510 to a position not overlapping the power transmitting coil 110 before the power transmitting coil 110 outputs power to the power receiving coil 210 regardless of presence or absence of a metal foreign object. Thereafter, the power transmission control circuit 150 causes the power transmitting coil 110 to output power to the power receiving coil 210.

If there is metal foreign object detection means, on the other hand, first, the power transmission control circuit 150 checks whether there is a metal foreign object held by the mobile member 510. If there is a metal foreign object, the power transmission control circuit 150 moves the mobile member 510 to a position not overlapping the power transmitting coil 110. Thereafter, the power transmission control circuit 150 causes the power transmitting coil 110 to output power to the power receiving coil 210.

If there is no metal foreign object, the power transmission control circuit 150 causes the power transmitting coil 110 to output power to the power receiving coil 210 without moving the mobile member 510.

An example of the operation of the power transmission control circuit 150 when the mobile member 510 is moved to a position not overlapping the power transmitting coil 110 will be described in more detail hereinafter.

FIG. 15A is a flowchart illustrating a basic flow of an operation performed by the power transmission control circuit 150. As illustrated in FIG. 15A, the power transmission control circuit 150 performs the following operation.

Step S101

The power transmission control circuit 150 determines, using the position sensor 140, whether the mobile object 200 overlaps the mobile member 510 (or whether the mobile object 200 covers the mobile member 510). More specifically, the power transmission control circuit 150 determines, on the basis of positional information or distance information regarding the mobile object 200 output from the position sensor 140, whether the mobile object 200 overlaps the mobile member 510. The determination is made at certain time intervals until the power transmission control circuit 150 determines that the mobile object 200 overlaps the mobile member 510. If the power transmission control circuit 150 determines that the mobile object 200 overlaps the mobile member 510, the operation proceeds to step S102.

Step S102

The power transmission control circuit 150 moves the mobile member 510 from a position overlapping the power transmitting coil 110 to a position not overlapping the power transmitting coil 110. The power transmission control circuit 150 moves the mobile member 510 by, for example, transmitting, to the actuator 530, an instruction to move the mobile member 510 in one direction by a certain distance. As a result, the opening 515 is exposed. If there is a metal foreign object 400 on the mobile member 510, the metal foreign object 400 moves to a position not overlapping the power transmitting coil 110 along with the mobile member 510 as a result of this operation. Even if there is no metal foreign object 400 on the mobile member 510, the mobile member 510 may be moved and the opening 515 may be exposed. In this case, presence or absence of the metal foreign object 400 on the mobile member 510 need not be detected.

Step S103

The power transmission control circuit 150 causes the power transmitting coil 110 to output power to the power receiving coil 210. In other words, the power transmission control circuit 150 controls a switching operation of the inverter circuit 160. As a result, the power transmitting coil 110 wirelessly transmits power to the power receiving coil 210.

As a result of the above operation, the mobile member 510 covers the opening 515 of the case 580 before transmission of power (supply of power) starts. As a result, the metal foreign object 400 is prevented from entering the case 580. After the mobile object 200 overlaps the mobile member 510, the mobile member 510 moves from the position overlapping the power transmitting coil 110. If there is a metal foreign object 400 on the mobile member 510, the metal foreign object 400 accordingly moves. Supply of power starts in this state. In the operation illustrated in FIG. 15A, the metal foreign object 400 is not detected and removed as in an example of the related art but is temporarily evacuated from a position overlapping the power transmitting coil 110. Even if no means for detecting the metal foreign object 400, such as a sensor, is provided, therefore, the problem of heating of the metal foreign object 400 can be solved with a simple, low-cost configuration.

As described with reference to FIGS. 14A and 14B, a sensor for detecting the metal foreign object 400 may be used. As described above, the power transmission control circuit 150 may move the mobile member 510 only when the sensor has detected the metal foreign object 400 on the mobile member 510. With this operation, power consumption caused by the movement of the mobile member 510 can be suppressed.

FIG. 15B is a flowchart illustrating an operation obtained by adding steps S104 and S105 to the operation illustrated in FIG. 15A. Steps S101 to S103 are the same as in FIG. 15A. In this example, the power transmission control circuit 150 performs the following operation after step S103.

Step S104

The power transmission control circuit 150 receives the instruction to stop transmitting power and stops transmitting power. The instruction to stop transmitting power is a signal given to the power transmitting device 100, for example, after charging of the battery is completed or the mobile object 200 begins to move. This signal can be transmitted, for example, to the communication circuit 170 of the power transmitting device 100 from the communication circuit 270 of the mobile object 200 (power receiving device). Upon receiving the instruction to stop transmitting power, the power transmission control circuit 150 stops driving the inverter circuit 160 to stop transmitting power.

Step S105

After stopping transmitting power, the power transmission control circuit 150 returns the mobile member 510 to a certain position on the power transmitting coil 110. The certain position on the power transmitting coil 110 is a position at which the mobile member 510 covers the opening 515. The certain position is, for example, the original position of the mobile member 510. The power transmission control circuit 150 returns the mobile member 510 to the original position, for example, by transmitting, to the actuator 530, an instruction to move the mobile member 510 in a direction opposite the movement direction by a certain distance. As a result of this operation, if there is a metal foreign object 400 on the mobile member 510, the mobile member 510 returns to the original position while holding the metal foreign object 400.

In the example of the operation illustrated in FIGS. 15A and 15B, the power transmission control circuit 150 begins to move when the mobile object 200 overlaps the mobile member 510. A determination as to the start of movement of the mobile member 510 may be made on the basis of another criterion. For example, the mobile member 510 may begin to move when the power transmitting coil 110 and the power receiving coil 210 have been aligned with each other. The "alignment" herein refers to an operation for moving the power transmitting coil 110 to a position at which power is efficiently transmitted. If the mobile object 200 has an autonomous driving function, for example, the alignment can be automatically performed.

FIG. 15C is a flowchart illustrating a basic flow of an operation for beginning to move the mobile member 510 when the power transmitting coil 110 and the power receiving coil 210 have been aligned with each other. As illustrated in FIG. 15C, the power transmission control circuit 150 performs the following operation.

Step S201

The power transmission control circuit 150 determines whether alignment between the power transmitting coil 110 and the power receiving coil 210 has been completed. The alignment is performed, for example, by a method described in the following (1) or (2).

(1) A mark (e.g., a circle) for the alignment is provided in advance on a surface of the mobile member 510. The control circuit in the mobile object 200 moves the mobile object 200 to the mark on the basis of an image obtained by a vehicle camera to align the power transmitting coil 110 and the power receiving coil 210 with each other.

(2) The control circuit in the mobile object 200 moves the mobile object 200 while monitoring power received by the power receiving coil 210. The control circuit in the mobile object 200 aligns the power transmitting coil 110 and the power receiving coil 210 with each other such that the received power exceeds a certain threshold.

The power transmission control circuit 150 can determine that the alignment has been completed, for example, when the power transmission control circuit 150 has received, from the mobile object 200, a signal indicating that the alignment has been completed. Alternatively, the power transmission control circuit 150 may determine that the alignment has been completed when the position sensor 140 has detected that the mobile object 200 has stopped.

Step S202

After the alignment between the power transmitting coil 110 and the power receiving coil 210 is completed, the power transmission control circuit 150 moves the mobile member 510 from a position overlapping the power transmitting coil 110 to a position not overlapping the power transmitting coil 110. The operation is the same as that in step S102 in the example illustrated in FIGS. 15A and 15B.

Step S203

The power transmission control circuit 150 causes the power transmitting coil 110 to output power to the power receiving coil 210. The operation is the same as that in step S103 illustrated in the example illustrated in FIGS. 15A and 15B.

In the operation illustrated in FIG. 15C, the mobile member 510 moves and outputting of power starts after it is confirmed that the alignment between the power transmitting coil 110 and the power receiving coil 210 has been completed. Since the outputting of power starts with the power transmitting coil 110 and the power receiving coil 210 magnetically coupled with each other, power can be efficiently transmitted.

Figure 15D:
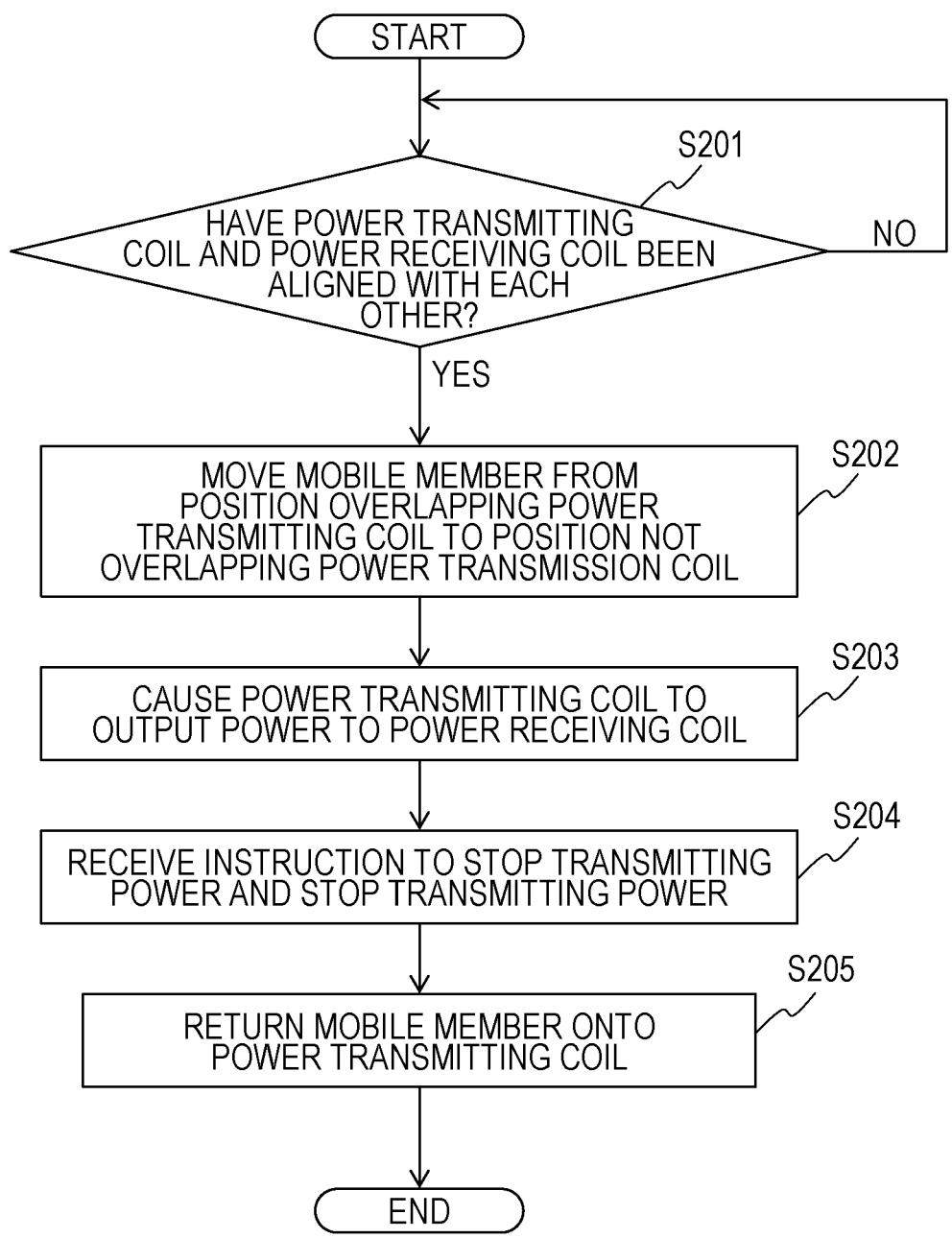
FIG. 15D is a flowchart illustrating an example of an operation obtained by adding steps S204 and S205 to the operation illustrated in FIG. 15C.

FIG. 15D is a flowchart illustrating an example of an operation obtained by adding steps S204 and S205 to the operation illustrated in FIG. 15C. Steps S201 to S203 are the same as in FIG. 15C. In this example, the power transmission control circuit 150 performs the following operation after step S203.

Step S204

The power transmission control circuit 150 receives an instruction to stop transmitting power and causes the inverter circuit 160 to stop transmitting power. This operation is the same as that in step S104 illustrated in FIG. 15B.

Step S205

After stopping transmitting power, the power transmission control circuit 150 returns the mobile member 510 to a certain position above the power transmitting coil 110. The certain position above the power transmitting coil 110 is a position at which the mobile member 510 covers the opening 515. The certain position can be, for example, the original position of the mobile member 510. This operation is the same as in step S105 illustrated in FIG. 15B.

Figure 15E:
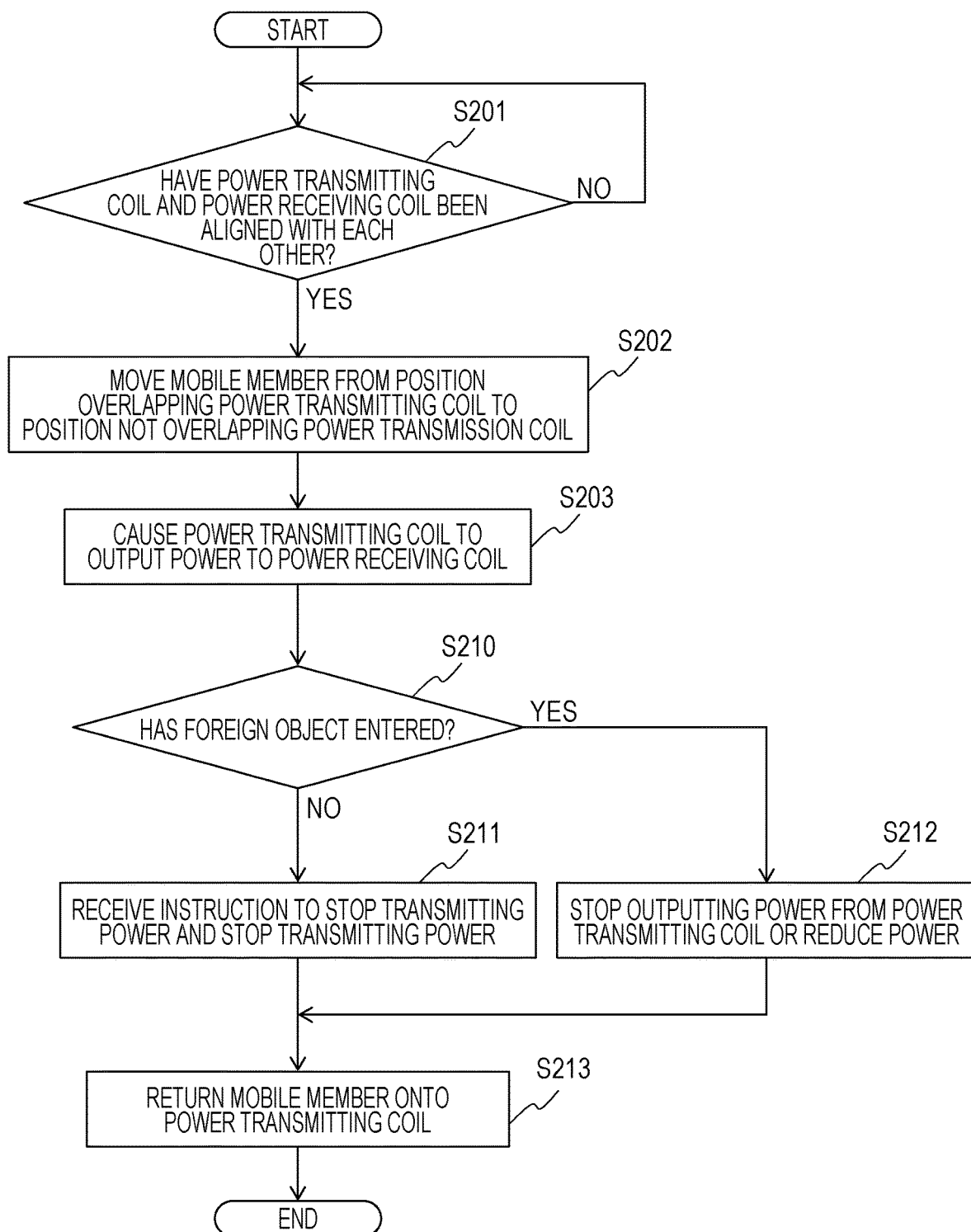
FIG. 15E is a flowchart illustrating another example of the operation of the power transmission control circuit.

FIG. 15E is a flowchart illustrating another example of the operation of the power transmission control circuit 150. In this example, the power transmission control circuit 150 performs the following operation after performing steps S201 to S203 illustrated in FIGS. 15C and 15D.

Step S210

The power transmission control circuit 150 determines whether a foreign object has entered during the transmission of power. Not only a metal foreign object but also a non-metal foreign object may be detected as a foreign object here.

If the foreign object is a non-metal foreign object such as a human body or an animal, an area affected by a magnetic field caused by the power transmitting coil 110 is defined as an area A.

If the foreign object is an empty can or a stone, an area in which the foreign object can damage the power transmitting device 100 is defined as an area B.

If the foreign object is a metal foreign object, an area in which the temperature of the metal foreign object held by the mobile member 510 can increase due to a magnetic field caused by the power transmitting coil 110 is defined as an area C.

The entry of a foreign object refers to entry of a foreign object into any of the areas A, B, and C.

The power transmission control circuit 150 can detect entry of a foreign object, for example, on the basis of a change in capacitance between electrodes for detecting a foreign object provided in the power transmitting circuit 120. The power transmission control circuit 150 measures the capacitance at certain time intervals during the transmission of power to constantly determine whether a foreign object has entered. As a specific method for detecting a foreign object, a method disclosed in Japanese Unexamined Patent Application Publication No. 2015-8546 or Japanese Unexamined Patent Application Publication No. 2015-220934, the entire contents of which are incorporated herein by reference, may be used.

If the foreign object is a metal foreign object, the metal foreign object is heated, and part of energy of transmitted power is taken away by the metal foreign object. A change in the energy of transmitted power, therefore, may be detected in order to determine whether there is a metal foreign object. The power transmission control circuit 150 can determine, for example, whether the metal foreign object 400 has come to a position overlapping the power transmitting coil 110 on the basis of the efficiency of the transmission of power. Alternatively, a camera that captures images of foreign objects, an infrared camera that detects temperature, or a sensor such as a thermistor may be used.

Step S211

If the power transmission control circuit 150 receives an instruction to stop transmitting power without detecting entry of a foreign object, the power transmission control circuit 150 causes the inverter circuit 160 to stop transmitting power. This operation is the same as that in step S204 illustrated in FIG. 15D.

Step S212

If the power transmission control circuit 150 detects entry of a foreign object, the power transmission control circuit 150 causes the inverter circuit 160 to stop transmitting power or reduce power. By forcibly stopping transmitting power or reducing power, safety can be secured. In this case, a notification (signal) indicating the presence of the foreign object may be transmitted to a device other than the power transmitting device 100 (e.g., an information device such as a smartphone or a server computer). As a result, a user or a manager can be notified of the presence of the foreign object and urged to remove the foreign object.

Step S213

After step S211 or S212, the power transmission control circuit 150 returns the mobile member 510 to the position overlapping the power transmitting coil 110. This operation is the same as that in step S205 illustrated in FIG. 15D.

In the above operation, if a foreign object enters an area near the power transmitting coil 110 during transmission of power, the inverter circuit 160 is automatically caused to stop transmitting power or reduce power. As a result, safety improves. Since the mobile object 200 covers the power transmitting coil 110 during transmission of power, it is unlikely that a foreign object enters. A metal foreign object such as a coin or an empty can, however, might come rolling toward the power transmitting coil 110. In addition, an animal such as a cat or a dog might crawl under the mobile object 200 and come close to the power transmitting coil 110. The operation illustrated in FIG. 15E reduces safety risks created by such an entry of a foreign object.

The detection of a foreign object in step S210 illustrated in FIG. 15E may be performed at another timing, instead. In order to detect a foreign object such as an animal, for example, whether a foreign object has entered may be constantly determined. If the power transmission control circuit 150 detects a foreign object, for example, the power transmission control circuit 150 may 1) keep the mobile member 510 still, 2) return the moving mobile member 510 to the original position, or 3) return, to the original position, the mobile member 510 that has finished moving. Alternatively, the power transmission control circuit 150 may move the mobile member 510 not to the original position but to another position at which the mobile member 510 covers the opening 515.

Second Embodiment

Figure 16A:
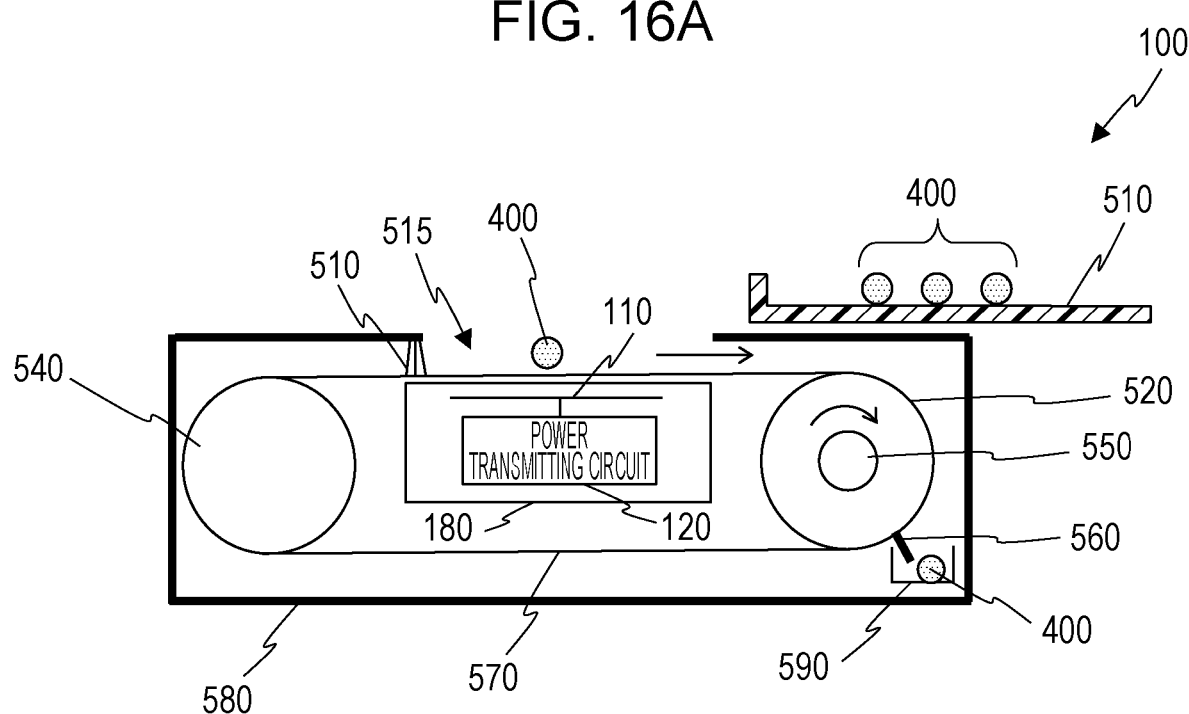
FIG. 16A is a cross-sectional view schematically illustrating the configuration of a power transmitting device according to a second embodiment.

FIG. 16A is a cross-sectional view schematically illustrating the configuration of a power transmitting device 100 according to the second embodiment. The power transmitting device 100 according to the present embodiment is different from the power transmitting device 100 according to the first embodiment in that the power transmitting device 100 according to the present embodiment includes a conveyor belt inside the case 580. Aside from this, the configuration of power transmitting device 100 according to the present embodiment is basically the same as that of the power transmitting device 100 according to the first embodiment.

In the power transmitting device 100 according to the present embodiment, if a foreign object (e.g., the metal foreign object 400) enters the case 580 through the opening 515 during transmission of power after the mobile member 510 is moved from the original position (the position overlapping the power transmitting coil 110), the foreign object is removed by the conveyor belt. The conveyor belt includes a belt 570, a roller 540, a driving roller 520, a driving motor 550, and a blade 560. The belt 570 is a flexible member surrounding the power transmitting circuit case 180. The belt 570 is held by the roller 540 and the driving roller 520 provided on both side of the power transmitting circuit case 180. The driving roller 520 is connected to the driving motor 550. The driving motor 550 rotates the driving roller 520 in accordance with an instruction from the power transmission control circuit 150. The blade 560 is provided near the circumference of the driving roller 520. The blade 560 is fixed, for example, to the case 580. The blade 560 and the belt 570 on the circumference of the driving roller 520 are preferably in contact with each other. A small gap may be provided between the blade 560 and the belt 570, instead, insofar as foreign objects can be removed. The blade 560 is provided in such a way as to drop foreign objects that move toward the blade 560 as the belt 570 rotates. Foreign objects dropped by the blade 560 are stored in the vessel 590 included in the power transmitting device 100.

The belt 570 can be composed of, for example, a material that is not easily heated by power output from the power transmitting coil 110. The belt 570 is desirably composed of, for example, a material containing a non-metal material or a non-magnetic material such as a resin, rubber, or cloth.

The belt 570 is held between the driving roller 520 and the roller 540 and rotated by the driving motor 550. The belt 570 runs through an area between the power transmitting coil 110 and the opening 515 and an area distant from the position overlapping the power transmitting coil 110. As a result, a foreign object that has entered the case 580 through the opening 515 while the mobile member 510 is open is conveyed by the belt 570 to the vessel 590 and stored in the vessel 590.

A material and a shape of the blade 560 are not particularly limited insofar as the blade 560 has a function of removing the metal foreign object 400 from the belt 570. The blade 560 can be, for example, an aluminum plate, a stainless steel plate, or a rubber member like a windshield wiper of an automobile. If a coordinate plane whose origin is at a position of a rotational axis of the driving roller 520 is assumed in the cross-sectional view of FIG. 16A, the blade 560 is preferably provided in a fourth quadrant of the coordinate plane. If a rotational direction of the driving roller 520 is opposite that illustrated in FIG. 16A, the blade 560 is preferably provided in a third quadrant of a coordinate plane whose origin is at a position of a rotational axis of the roller 540. That is, the blade 560 is preferably provided near a part of the belt 570, which is in contact with the driving roller 520 and the roller 540, lower than the rotational axis of the driving roller 520 or the roller 540.

The case 580 according to the present embodiment includes a foreign object entry prevention member 510 around the opening 515 at a position near the roller 540. A material of the foreign object entry prevention member 510 is not particularly limited insofar as the foreign object entry prevention member 510 has a structure for preventing the metal foreign object 400 from entering the case 580. The foreign object entry prevention member 510 preferably has a platelike shape or a brash-like shape having a large number of fibers or the like.

A weight sensor may be provided under the vessel 590. When a weight sensor is provided, the weight of foreign objects stored in the vessel 590 can be measured. If the total weight of foreign objects measured by the weight sensor exceeds a threshold, the power transmission control circuit 150 may transmit a signal indicating the excess to another device (e.g., a smartphone or a server computer) through the communication circuit 170. As a result, the manager, for example, can remove the foreign objects stored in the vessel 590 or replace the vessel 590 with a new vessel 590 by dispatching a janitor.

Mechanisms for removing foreign objects using a conveyor belt are disclosed in Japanese Unexamined Patent Application Publication No. 2016-59139 and Japanese Unexamined Patent Application Publication No. 2015-100162. The mechanisms disclosed in these examples of the related art can be employed as necessary. The entire contents of these examples of the related art are incorporated herein by reference.

Figure 16B:
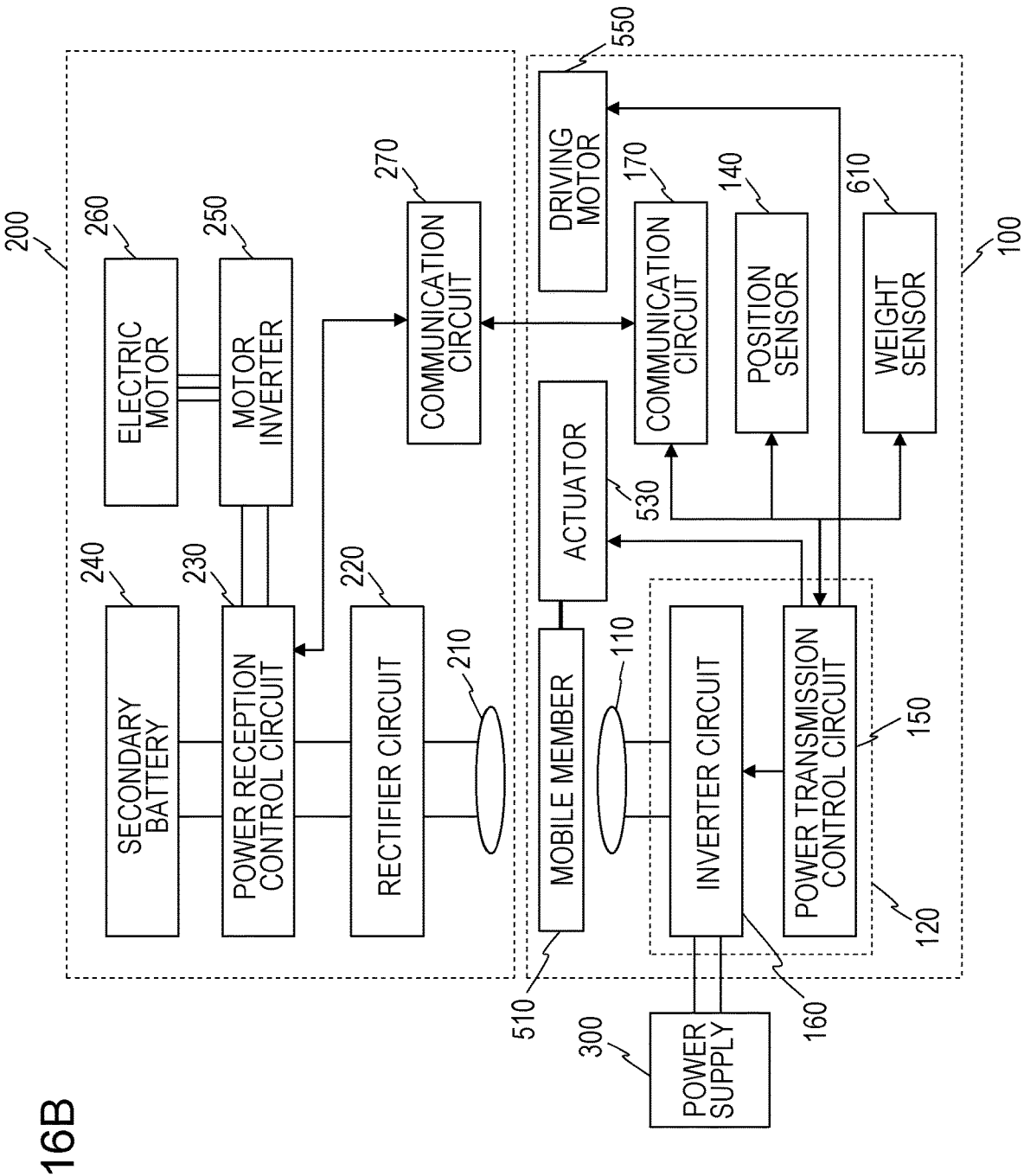
FIG. 16B is a block diagram illustrating the configuration of a wireless power transmission system according to the second embodiment.

FIG. 16B is a block diagram illustrating a schematic configuration of a wireless power transmission system according to the second embodiment. In the configuration illustrated in FIG. 16B, the driving motor 550 and a weight sensor 610 are added to the configuration illustrated in FIG. 9. In FIG. 16B, the components such as the roller 540, the driving roller 520, and the belt 570 are omitted. The driving motor 550 is rotated by the power transmission control circuit 150, and the belt 570 is rotated through the driving roller 520. The weight sensor 610 is provided under the vessel 590 and measures the weight of foreign objects stored in the vessel 590. If a weight measured by the weight sensor 610 exceeds the threshold, the power transmission control circuit 150 transmits a notification indicating the excess to an external device through the communication circuit 170.

Figure 17:
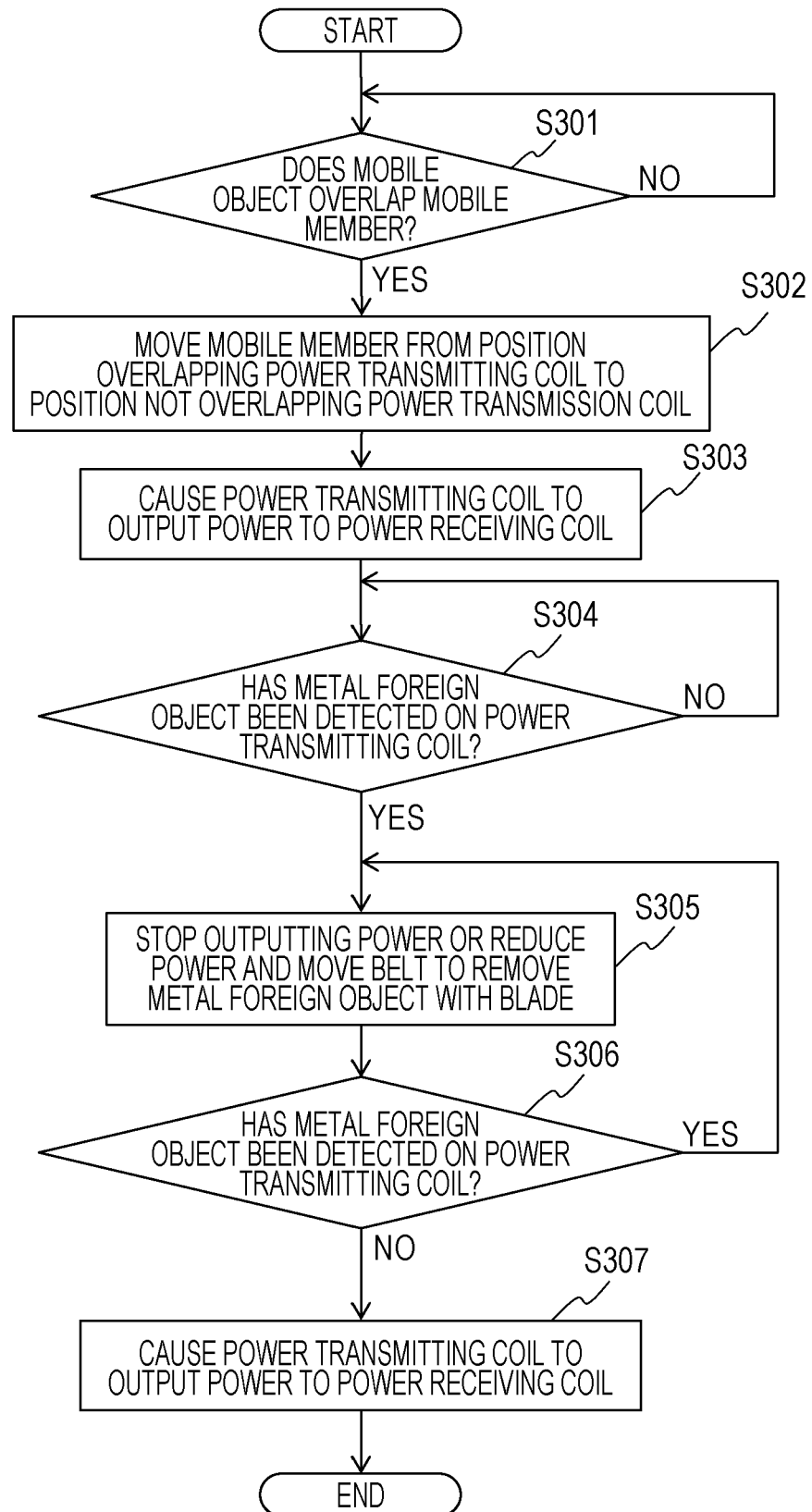
FIG. 17 is a flowchart illustrating an example of the operation of the power transmitting device according to the second embodiment.

FIG. 17 is a flowchart illustrating an example of the operation of the power transmitting device 100 according to the second embodiment. The power transmission control circuit 150 performs steps S301 to S307 illustrated in FIG. 17. Steps S301 to S303 are the same as steps S101 to S103, respectively, illustrated in FIG. 15A, and description thereof is omitted. In the present embodiment, the power transmission control circuit 150 performs the following operation after beginning to transmit power from the power transmitting coil 110 to the power receiving coil 210.

Step S304

The power transmission control circuit 150 determines whether a metal foreign object 400 has come to a position overlapping the power transmitting coil 110. Whether there is a metal foreign object 400 can be determined, for example, on the basis of the efficiency of power transmission. More specifically, transmitted power and received power are compared with each other, and if a ratio of the received power to the transmitted power is lower than a threshold (e.g., 80%), it can be determined that there is a metal foreign object 400. The transmitted power can be calculated from measured values of voltage and current in a circuit of the power transmitting device 100. The received power can be calculated from measured values of voltage and current in a circuit of the power receiving device. In a system in which information regarding received power is constantly transmitted to the power transmitting device 100 from the power receiving system during transmission of power, the power transmission control circuit 150 can calculate the ratio of the transmitted power and the received power on the basis of the information regarding the received power. When this operation is performed, the power transmitting device 100 can include, for example, a measuring device that measures a voltage and a current output from the inverter circuit 160. The power receiving device can include, for example, a measuring device that measures a voltage and a current input to the rectifier circuit 220.

Step S305

If a metal foreign object 400 is detected, the power transmission control circuit 150 stops transmitting power or reduces power and causes the driving motor 550 to rotate to move the belt 570. The metal foreign object 400 is thus removed. The metal foreign object 400 is removed by the blade 560 and stored in the vessel 590.

Step S306

The power transmission control circuit 150 then determines whether the metal foreign object 400 has come to the position overlapping the power transmitting coil 110 again. The determination is made, for example, when the belt 570 has made a round. This operation is the same as that in step S304. If the metal foreign object 400 is detected, step S305 is performed again.

Step S307

If the metal foreign object 400 is not detected in step S306, the power transmission control circuit 150 drives the inverter circuit 160 to cause the power transmitting coil 110 to output power to the power receiving coil 210. As a result, the transmission of power resumes.

As a result of the above operation, if a metal foreign object 400 has come to a position overlapping the power transmitting coil 110 through the opening 515, transmission of power is temporarily stopped or power is reduced. After the metal foreign object 400 is removed, the transmission of power resumes. As a result, safer transmission of power can be achieved.

Figure 18:
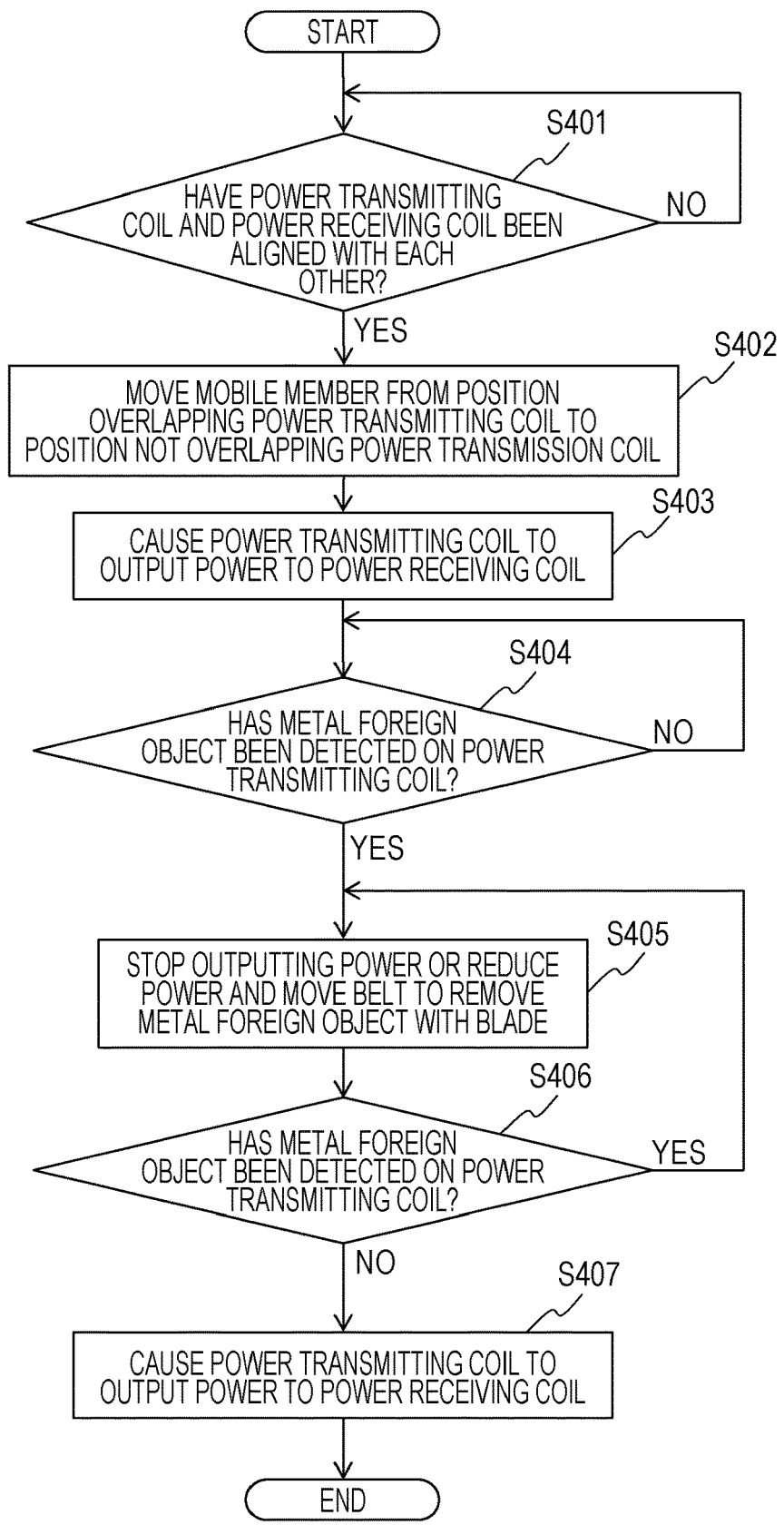
FIG. 18 is a flowchart illustrating another example of the operation according to the second embodiment.

FIG. 18 is a flowchart illustrating another example of the operation according to the second embodiment. In this example, step S401 is performed instead of step S301 illustrated in FIG. 17. Step S401 is the same as step S201 illustrated in FIG. 15C. In step S401, the power transmission control circuit 150 moves the mobile member 510 after the power transmitting coil 110 and the power receiving coil 210 are aligned with each other. Subsequent steps S402 to S407 are the same as steps S302 to S307, respectively, illustrated in FIG. 17, and description thereof is omitted.

In the examples illustrated in FIGS. 17 and 18, the power transmission control circuit 150 detects a metal foreign object 400, rotates the belt 570, and removes the metal foreign object 400 with the blade 560. If the power transmitting device 100 does not include means for detecting the metal foreign object 400, the power transmission control circuit 150 may move the belt 570 before outputting power from the power transmitting coil 110 to the power receiving coil 210. The power transmission control circuit 150 may then stop the belt 570 after receiving an instruction to stop transmitting power.

Third Embodiment

Figure 19A:
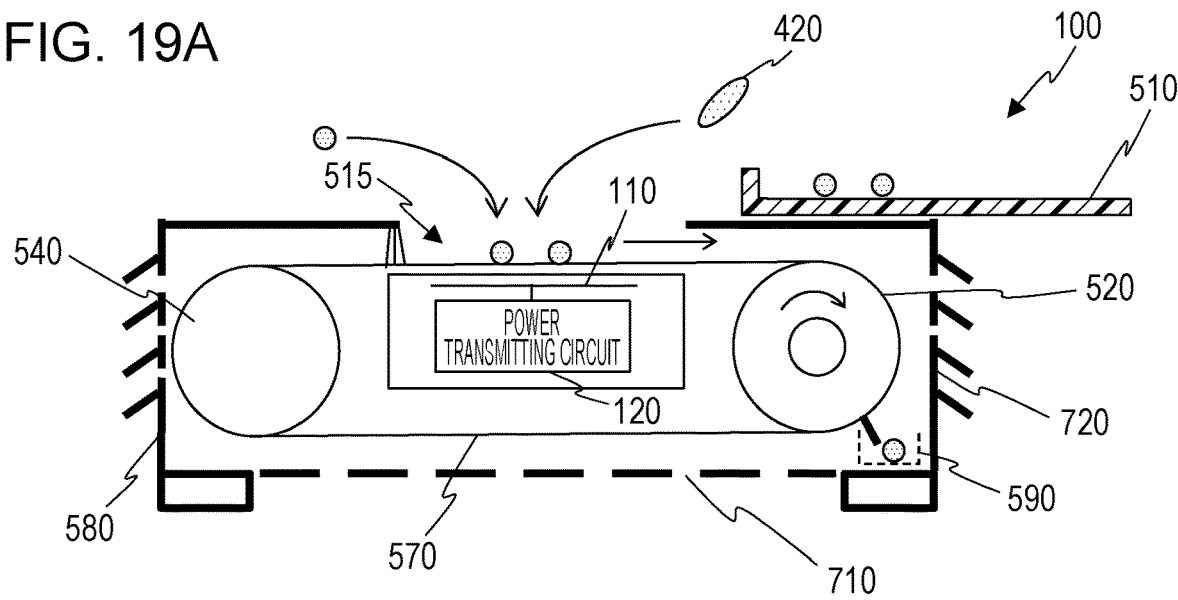
FIG. 19A is a diagram schematically illustrating the configuration of a power transmitting device according to a third embodiment.

FIG. 19A is a diagram schematically illustrating the configuration of a power transmitting device 100 according to the third embodiment of the present disclosure. The power transmitting device 100 according to the present embodiment is different from the power transmitting device 100 according to the second embodiment in that the power transmitting device 100 according to the present embodiment includes a mechanism for discharging water.

The power transmitting device 100 is configured to prevent water (rainwater, etc.) from entering from the opening 515 when the mobile member 510 covers the opening 515. It is desirable, for example, to prevent water from entering from a gap between the opening 515 and the mobile member 510 using a rail structure like a window frame or a piece of rubber.

Since the mobile member 510 does not cover the power transmitting coil 110 during transmission of power, the opening 515 is exposed. Water might enter the case 580 from the opening 515 at this time. Although the mobile object 200 covers the opening 515, water might enter through the opening 515 in the case of rainy weather.

The case 580 of the power transmitting device 100 according to the present embodiment includes an overflow 710 in a bottom surface thereof. When the overflow 710 is provided, water can be discharged from the case 580. The overflow 710 can be achieved by a plurality of holes or a mesh structure provided in the bottom surface of the case 580.

The case 580 according to the present embodiment includes air vents 720 in side surfaces thereof. The air vents 720 are used to discharge water and vapor from the case 580. The vessel 590, too, may include an overflow and air vents.

Figure 19B:
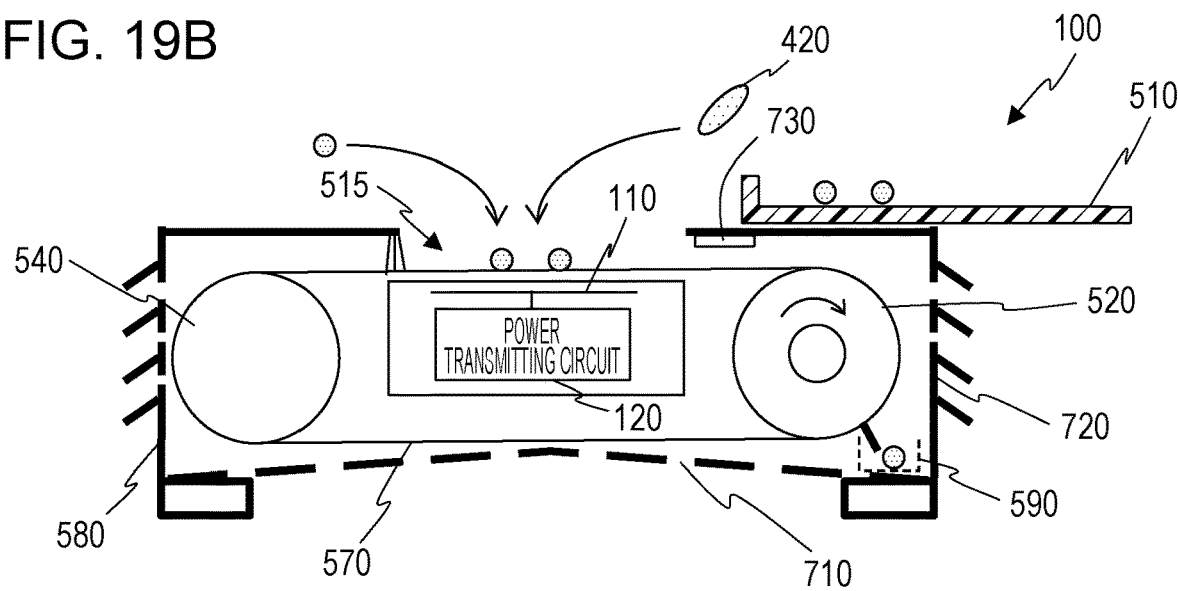
FIG. 19B is a diagram illustrating another example of the configuration of the power transmitting device according to the third embodiment.

FIG. 19B is a diagram illustrating another example of the configuration according to the present embodiment. In this example, the power transmitting device 100 includes a water detection sensor 730 that detects water. The water detection sensor 730 is provided near the opening 515 of the case 580. The water detection sensor 730 can be, for example, a noncontact water detection sensor that radiates light onto water on the belt 570 and that detects the water by comparing the amount of incident light with the amount of reflected light on the basis of a difference in a refractive index of light. The noncontact water detection sensor includes a light source (e.g., a visible light source or a near-infrared light source) and a light receiving device. The amount of reflected light when there is water, for example, is smaller than the amount of reflected light when there is no water. As a result, entry of water into the case 580 can be detected. When water needs to be removed, the power transmission control circuit 150 can drive the belt 570 on the basis of a signal output from the water detection sensor 730.

In the example illustrated in FIG. 19B, the bottom surface of the case 580 is higher at the center and lower in the periphery. When such a structure is employed, water can be discharged more easily.

Figure 19C:
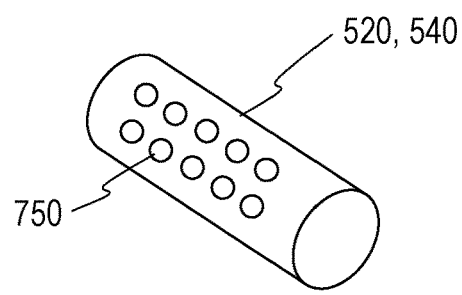
FIG. 19C is a diagram illustrating an example of the configuration of two rollers according to the third embodiment.

The roller 540 and/or the driving roller 520 are preferably composed of a material such as stainless wheel in order to prevent rust. If there is water between the belt 570 and the roller 540 or between the belt 570 and the driving roller 520, the water might not be removed, and the belt 570 might get stuck due to mold. In order to reduce a contact area, therefore, the roller 540 and/or the driving roller 520 may include one or more holes 750 as illustrated in FIG. 19C. The holes 750 allow water on a surface of the roller 540 and/or the driving roller 520 to move into the roller 540 and/or the driving roller 520, and the above problem can be suppressed.

When the mobile member 510 is moved to expose the opening 515 and start transmission of power, water might fall onto the belt 570. In addition, water might fall onto the belt 570, and then the metal foreign object 400 might enter.

In addition, the metal foreign object 400 might enter onto the belt 570, and water might fall onto the belt 570. In the above cases, the metal foreign object 400 is strongly adhered to the belt 570 due to the water, and it might be difficult for the blade 560 to remove the metal foreign object 400.

The power transmitting device 100 according to the present embodiment may therefore move the belt 570 for a certain period of time in order to remove water on the belt 570, and the blade 560 may remove the water. In this case, the blade 560 also functions as a water removal member. The water removal member is provided along the belt 570 and has a structure for removing water.

Figure 20:
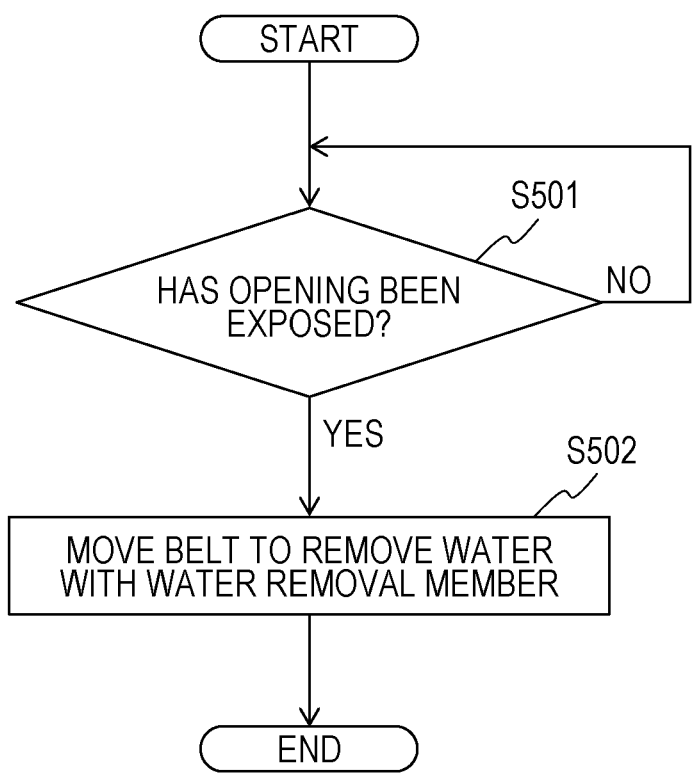
FIG. 20 is a flowchart illustrating a basic operation of a power transmission control circuit according to the third embodiment.

FIG. 20 is a flowchart illustrating a basic operation of the power transmission control circuit 150 according to the present embodiment. If the opening 515 is exposed in step S501, the operation proceeds to step S502. The power transmission control circuit 150 moves the belt 570 to remove water or a foreign object with the blade 560 (or a water removal member). As a result of this operation, water or a foreign object on the belt 570 can be removed. The power transmission control circuit 150 may drive the belt 570 at any timing, namely before transmission of power, during transmission of power, while transmission of power is temporarily stopped, or after transmission of power is completed.

The belt 570 and the mobile member 510 may be driven independently of each other. For example, the power transmission control circuit 150 may cover the opening 515 by returning the mobile member 510 to the original position while rotating the belt 570 after completing transmission of power by exposing the opening 515. Alternatively, the power transmission control circuit 150 may move the belt 570 for a certain period of time when the opening 515 is covered, that is, for example, before the opening 515 is exposed or after the opening 515 is exposed and then covered.

After performing steps S401 to S406 illustrated in FIG. 18, for example, the power transmission control circuit 150 may detect water with the water detection sensor 730 before step S407 and, if entry of water onto the belt 570 is detected, remove the water while moving the belt 570. If entry of water is not detected, the power transmission control circuit 150 may stop the belt 570 and start transmitting power from the power transmitting coil 110 to the power receiving coil 210.

Fourth Embodiment

Next, a power transmitting device 100 according to a fourth embodiment of the present disclosure will be described.

Figure 21A:
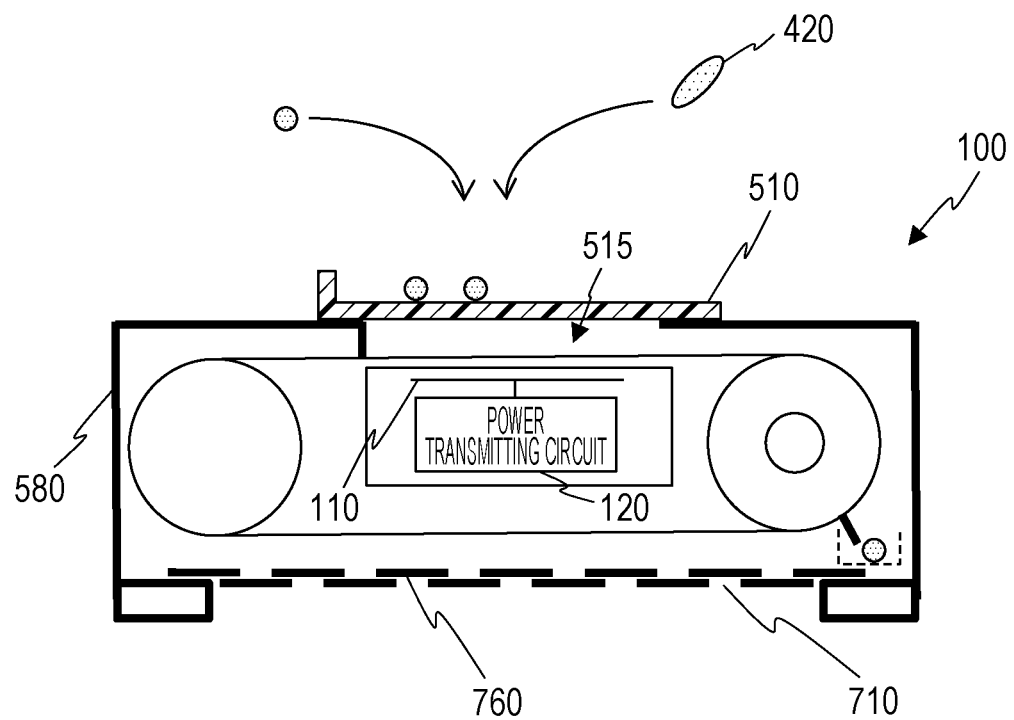
FIG. 21A is a cross-sectional view schematically illustrating a power transmitting device according to the third embodiment.
Figure 21B:
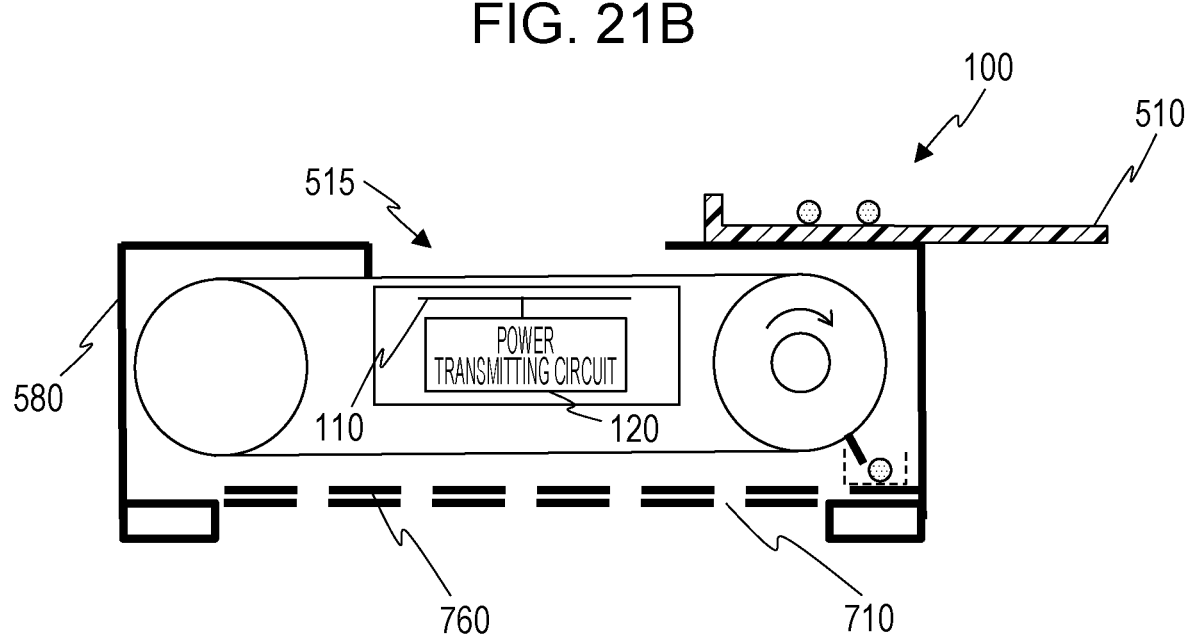
FIG. 21B is a cross-sectional view schematically illustrating the power transmitting device according to the third embodiment.

FIGS. 21A and 21B are cross-sectional views schematically illustrating the power transmitting device 100 according to the present embodiment. FIG. 21A illustrates a state where the mobile member 510 covers the opening 515. FIG. 21B illustrates a state where the opening 515 is exposed. The power transmitting device 100 according to the present embodiment is different from the power transmitting device 100 according to the third embodiment in that the power transmitting device 100 according to the present embodiment includes a movable shutter 760 at the bottom surface of the case 580. The power transmission control circuit 150 slides the shutter 760 along the bottom surface of the case 580. As a result, the overflow 710 can be opened and closed. As illustrated in FIG. 21A, when the mobile member 510 covers the opening 515 (e.g., before the mobile object 200 covers the power transmitting device 100), the power transmission control circuit 150 causes the shutter 760 to cover the overflow 710. As a result, water and dust are prevented from entering the case 580.

As illustrated in FIG. 21B, the power transmission control circuit 150 opens the shutter 760 when the mobile member 510 opens at a beginning of transmission of power. As a result, water can be discharged from the overflow 710. The shutter 760 may open at the same timing as the mobile member 510 opens or at a timing different from a timing at which the mobile member 510 opens. The power transmission control circuit 150 may open the shutter 760 only when the power transmission control circuit 150 has determined that water needs to be discharged.

The shutter 760 can be composed of a material such as a metal or a resin. The shutter 760 may be composed of any material insofar as the shutter 760 can prevent entry of water and dust.

As described above, according to the present embodiment, the overflow 710 can be opened and closed by the shutter 760. The overflow 710 may therefore be closed when water need not be discharged. In addition to the advantageous effects produced by the third embodiment, therefore, entry of water and dust can be prevented.

Modification

In the operation illustrated in FIG. 8K, 15A, 15B, or 17, the power transmission control circuit 150 moves the mobile member 510 from a position overlapping the power transmitting coil 110 to a position not overlapping the power transmitting coil 110 after the mobile object 200 overlaps the mobile member 510. Alternatively, the power transmission control circuit 150 may move the mobile member 510 before the mobile object 200 overlaps the mobile member 510. For example, the power transmission control circuit 150 may measure a distance between the mobile object 200 and the power transmitting device 100 with the position sensor 140 and, if determining that the distance is smaller than a certain value, move the mobile member 510.

In the operation illustrated in FIG. 15C, 15D, 15E, or 18, the power transmission control circuit 150 moves the mobile member 510 from a position overlapping the power transmitting coil 110 to a position not overlapping the power transmitting coil 110 after the power transmitting coil 110 and the power receiving coil 210 are aligned with each other. Alternatively, the power transmission control circuit 150 may move the mobile member 510 before the power transmitting coil 110 and the power receiving coil 210 are aligned with each other.

In the operation illustrated in FIG. 8K, 15A, 15E, or the like, the power transmission control circuit 150 causes the power transmitting coil 110 to output power to the power receiving coil 210 after moving the mobile member 510 to the original position (i.e., a position overlapping the power transmitting coil 110). Alternatively, the power transmission control circuit 150 may cause the power transmitting coil 110 to output power to the power receiving coil 210 without moving the mobile member 510 if the mobile member 510 does not hold the metal foreign object 400.

As described above, the present disclosure includes methods and power transmitting devices described in the following items.

Item 1

A method for controlling a power transmitting device including a power transmitting coil that outputs power to a power receiving coil, a case that includes the power transmitting coil inside thereof, and a mobile member arranged on a surface of the case at a position overlapping the power transmitting coil, the method comprising:

moving, if the mobile member holds a metal foreign object, the metal foreign object from the position overlapping the power transmitting coil to a position not overlapping the power transmitting coil by moving the mobile member from the position overlapping the power transmitting coil to a position not overlapping the power transmitting coil before the power transmitting coil begins to transmit the power to the power receiving coil;

causing the power transmitting coil to output the power to the power receiving coil; and moving, if another metal foreign object comes to the position overlapping the power transmitting coil when the mobile member is located at the position not overlapping the power transmitting coil, the other metal foreign object from the position overlapping the power transmitting coil to a position not overlapping the power transmitting coil by returning the mobile member from the position not overlapping the power transmitting coil to the position overlapping the power transmitting coil in the state where the mobile member holds the foreign matter.

Item 2

The method according to Item 1, further including:

moving the mobile member from the position overlapping the power transmitting coil to the position not overlapping the power transmitting coil after a mobile object including the power receiving coil overlaps the mobile member.

Item 3

The method according to Item 1 or 2, further including:

moving the mobile member from the position overlapping the power transmitting coil to the position not overlapping the power transmitting coil after the power receiving coil and the power transmitting coil are aligned with each other.

Item 4

The method according to any of Items 1 to 3, in which the case includes an opening larger than the power transmitting coil at a position overlapping the power transmitting coil, the method further including:

moving, before the power transmitting coil begins to transmit the power to the power receiving coil, the mobile member from a position overlapping the opening to a position not overlapping the opening.

Item 5

The method according to any of Items 1 to 4, further including:

causing the power transmitting coil to output the power to the power receiving coil after moving the mobile member from the position overlapping the power transmitting coil to the position not overlapping the power transmitting coil.

Item 6

The method according to any of Items 1 to 5, further including:

returning, if an instruction to stop outputting the power is received after the power transmitting coil is caused to output the power to the power receiving coil, the mobile member to the position overlapping the power transmitting coil with the mobile member holding the metal foreign object.

Item 7

The method according to any of Items 1 to 6, in which the power transmitting device further includes, inside the case, a belt located between the power transmitting coil and the opening, the method further including:

moving, if it is determined that the metal foreign object has entered onto the belt through the opening, the metal foreign object to a position not overlapping the power transmitting coil using the belt.

Item 8

The method according to any of Items 1 to 7, in which the mobile member includes a flat bottom surface, in which the case includes a flat upper surface, and in which the power transmitting device further includes an actuator that moves the mobile member along the upper surface of the case.

Item 9

A method for controlling a power transmitting device including a power transmitting coil for outputting power to a power receiving coil, a case that includes the power transmitting coil inside thereof and an opening larger than the power transmitting coil at a position overlapping the power transmitting coil, and a mobile member that is arranged on a surface of the case, that overlaps the opening, and that holds a metal foreign object, the method including:

moving, if the mobile member holds a metal foreign object, the metal foreign object from a position overlapping the power transmitting coil to a position not overlapping the power transmitting coil by moving the mobile member from the position overlapping the power transmitting coil to a position not overlapping the power transmitting coil before the power transmitting coil begins to transmit the power to the power receiving coil.

Item 10

The method according to Item 9, further including:

causing the power transmitting coil to output the power to the power receiving coil after moving the mobile member from the position overlapping the power transmitting coil to the position not overlapping the power transmitting coil.

Item 11

The method according to Item 9 or 10, further including:

returning, if an instruction to stop outputting the power is received after the power transmitting coil is caused to output the power to the power receiving coil, the mobile member to the position overlapping the power transmitting coil with the mobile member holding the metal foreign object.

Item 12

The method according to any of Items 9 to 11, further including:

moving the mobile member from the position overlapping the power transmitting coil to the position not overlapping the power transmitting coil after a mobile object including the power receiving coil overlaps the mobile member.

Item 13

The method according to any of Items 9 to 12, moving the mobile member from the position overlapping the power transmitting coil to the position not overlapping the power transmitting coil after the power receiving coil and the power transmitting coil are aligned with each other.

Item 14

The method according to any of Items 9 to 13, in which the power transmitting device further includes, inside the case, a belt located between the power transmitting coil and the opening, the method further including:

moving, if it is determined that the metal foreign object has entered onto the belt through the opening, the metal foreign object to a position not overlapping the power transmitting coil using the belt.

Item 15
The method according to any of Items 1 to 14,
in which the mobile member includes a flat bottom surface,
in which the case includes a flat upper surface, and
in which the power transmitting device further includes an actuator that moves the mobile member along the upper surface of the case.

Item 16
A power transmitting device including:
a power transmitting coil for outputting power to a power receiving coil;
a case that includes the power transmitting coil inside thereof;
a mobile member arranged on a surface of the case at a position overlapping the power transmitting coil; and
a power transmission control circuit that controls the power output from the power transmitting coil and the mobile member,
in which the power transmission control circuit performs operations including
moving, if the mobile member holds a metal foreign object, the metal foreign object from a position overlapping the power transmitting coil to a position not overlapping the power transmitting coil by moving the mobile member from the position overlapping the power transmitting coil to a position not overlapping the power transmitting coil before the power transmitting coil begins to transmit the power to the power receiving coil, and
returning, after the outputting of the power is completed, the mobile member from the position not overlapping the power transmitting coil to the position overlapping the power transmitting coil with the mobile member holding the metal foreign object.

Item 17
The power transmitting device according to Item 16, further including:
a belt located between the power transmitting coil and the opening inside the case,
in which, if it is determined that the metal foreign object has entered onto the belt through the opening, the metal foreign object is moved to a position not overlapping the power transmitting coil using the belt.

Item 18
A power transmitting device including:
a power transmitting coil for outputting power to a power receiving coil;
a case that includes the power transmitting coil inside thereof and an opening larger than the power transmitting coil at a position overlapping the power transmitting coil;
a mobile member that is arranged on a surface of the case, that overlaps the opening, and that holds a metal foreign object; and
a power transmission control circuit that controls the power output from the power transmitting coil and the mobile member,
in which the power transmission control circuit performs operations including
moving, if the mobile member holds a metal foreign object, the metal foreign object from a position overlapping the power transmitting coil to a position not overlapping the power transmitting coil by moving the mobile member from the position overlapping the power transmitting coil to a position not overlapping the power transmitting coil before the power transmitting coil begins to transmit the power to the power receiving coil.

Item 19
The power transmitting device according to Item 18,
in which the case further includes, inside thereof, a belt located between the power transmitting coil and the opening, and
in which, if it is determined that the metal foreign object has entered onto the belt through the opening, the metal foreign object is moved to a position not overlapping the power transmitting coil using the belt.

Item 20
A method for controlling a power transmitting device including a power transmitting coil for outputting power to a power receiving coil, a case that includes the power transmitting coil inside thereof and an opening larger than the power transmitting coil at a position overlapping the power transmitting coil, a mobile member that is arranged on a surface of the case, that overlaps the opening, and that holds a metal foreign object, and an overflow that discharges water that has entered the case, the method including:
moving, if the mobile member holds a metal foreign object, the metal foreign object from a position overlapping the power transmitting coil to a position not overlapping the power transmitting coil by moving the mobile member from the position overlapping the power transmitting coil to a position not overlapping the power transmitting coil before the power transmitting coil begins to transmit the power to the power receiving coil.

Item 21
The method according to Item 20,
in which the power transmitting device further includes, inside the case, a belt located between the power transmitting coil and the opening and a water removal member arranged along the belt, and
in which, after the mobile member begins to move from the position overlapping the power transmitting coil to the position not overlapping the power transmitting coil, the water removal member removes water that has entered onto the belt by driving the belt.

Item 22
A power transmitting device including:
a power transmitting coil for outputting power to a power receiving coil;
a case that includes the power transmitting coil inside thereof and an opening larger than the power transmitting coil at a position overlapping the power transmitting coil;
a mobile member that is arranged on a surface of the case, that overlaps the opening, and that holds a metal foreign object;
an overflow that discharges water that has entered the case; and
a power transmission control circuit that controls the power output from the power transmitting coil,
in which the power transmission control circuit performs operations including
moving, if the mobile member holds a metal foreign object, the metal foreign object from a position overlapping the power transmitting coil to a position not overlapping the power transmitting coil by moving the mobile member from the position overlapping the power transmitting coil to a position not overlapping the power transmitting coil before the power transmitting coil begins to transmit the power to the power receiving coil.

Item 23
The power transmitting device according to Item 22, further including:
a belt located between the power transmitting coil and the opening inside the case; and
a water removal member arranged along the belt, in which, after the mobile member begins to move from the position overlapping the power transmitting coil to the position not overlapping the power transmitting coil, the water removal member removes water that has entered onto the belt by driving the belt.

The techniques in the present disclosure can be applied to any situation in which power is wirelessly supplied to a mobile object such as a vehicle. For example, the techniques in the present disclosure can be applied to a situation in which power is supplied to a mobile object on a road, in a parking lot, or in a factory.

What is claimed is:

1. A device comprising:
    a power transmitting coil that outputs power to a power receiving coil included in a mobile object;
    a case that includes the power transmitting coil inside thereof;
    a mobile member arranged on the case at a position overlapping the power transmitting coil; and
    a circuit that controls the power transmitting coil and the mobile member, wherein
    the circuit
        starts to perform an operation to move the mobile member from a position overlapping the power transmitting coil to a position not overlapping the power transmitting coil before the power transmitting coil and the power receiving coil are aligned with each other; and
        causes the power transmitting coil to output the power to the power receiving coil.

2. The device according to claim 1, wherein the circuit starts to perform the operation before the mobile object overlaps the mobile member.

3. The device according to claim 1, wherein the circuit starts to perform the operation after the mobile object overlaps the mobile member.

4. The device according to claim 1, wherein the circuit starts to perform the operation in response to a determination that a distance between the mobile object and the device is smaller than a certain value.

5. The device according to claim 4, further comprising a sensor to detect the distance, and wherein the circuit determines if the distance is smaller or not based on a signal from the sensor.

6. The device according to claim 1, wherein the circuit starts to perform the operation when the mobile member holds a metal foreign object.

7. The device according to claim 1, wherein the circuit causes the power transmitting coil to output the power after the mobile member has moved from a position overlapping the power transmitting coil to a position not overlapping the power transmitting coil.

8. The device according to claim 1, wherein the circuit performs an operation to return, in response to an instruction to stop outputting the power, the mobile member to the position overlapping the power transmitting coil in the state where the mobile member holds the foreign matter.

9. A method comprising:
    starting to move a mobile member from a position overlapping a power transmitting coil to a position not overlapping the power transmitting coil before the power transmitting coil and a power receiving coil are aligned with each other, the power receiving coil being included in a mobile object; and
    causing the power transmitting coil to output the power to the power receiving coil.

10. The method according to claim 9, wherein the moving the mobile member is started before the mobile object overlaps the mobile member.

11. The method according to claim 9, wherein the moving the mobile member is started after the mobile object overlaps the mobile member.

12. The method according to claim 9, wherein the moving the mobile member is started in response to a determination that a distance between the mobile object and the device is smaller than a certain value.

13. The method according to claim 12, further comprising:
    determining if the distance is smaller or not based on a signal from a sensor that detects the distance.

14. The method according to claim 9, wherein the moving the mobile member is started when the mobile member holds a metal foreign object.

15. The method according to claim 9, wherein the causing the power transmitting coil to output the power includes causing the power transmitting coil to output the power after the mobile member has moved from a position overlapping the power transmitting coil to a position not overlapping the power transmitting coil.

16. The method according to claim 9, further comprising:
    returning, in response to an instruction to stop outputting the power, the mobile member to the position overlapping the power transmitting coil in the state where the mobile member holds the foreign matter.

* * * * *